(12) United States Patent
Nonaka et al.

(10) Patent No.: US 11,772,516 B2
(45) Date of Patent: Oct. 3, 2023

(54) CONVEYANCE SEAT

(71) Applicant: TS TECH CO., LTD., Asaka (JP)

(72) Inventors: Hidetsune Nonaka, Tochigi (JP);
Daisuke Kikuchi, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 71 days.

(21) Appl. No.: 17/426,824

(22) PCT Filed: Jan. 29, 2020

(86) PCT No.: PCT/JP2020/003124
§ 371 (c)(1),
(2) Date: Jul. 29, 2021

(87) PCT Pub. No.: WO2020/158786
PCT Pub. Date: Aug. 6, 2020

(65) Prior Publication Data
US 2022/0118884 A1     Apr. 21, 2022

(30) Foreign Application Priority Data

Jan. 30, 2019  (JP) ................................. 2019-014222
Jul. 31, 2019  (JP) ................................. 2019-140877

(51) Int. Cl.
*B60N 2/68* (2006.01)
*B60N 2/015* (2006.01)
(Continued)

(52) U.S. Cl.
CPC ............ *B60N 2/005* (2013.01); *B60N 2/0155* (2013.01); *B60N 2/06* (2013.01); *B60N 2/68* (2013.01); *B60N 2205/20* (2013.01)

(58) Field of Classification Search
CPC .......... B60N 2/60; B60N 2/68; B60N 2/0155; B60N 2/01583
See application file for complete search history.

(56) References Cited

U.S. PATENT DOCUMENTS

2009/0134686 A1\*  5/2009  Naito ..................... B60N 2/646
                                                          297/452.55
2013/0341484 A1   12/2013  Yamada et al.
(Continued)

FOREIGN PATENT DOCUMENTS

DE   102007006439 A1 \*  9/2007  ........... B60N 2/0232
DE   102011111173 A1 \*  3/2012  ............... B60N 2/06
(Continued)

OTHER PUBLICATIONS

International Search Report and Written Opinion with English Translation issued in PCT/JP2020/003124, dated Mar. 31, 2020 (8 pages).

*Primary Examiner* — Timothy J Brindley
(74) *Attorney, Agent, or Firm* — Dority & Manning, P.A.

(57) ABSTRACT

A seat support of the conveyance seat includes right and left front foot members that are attached to a body floor with a gap therebetween in a seat width direction and extend to protrude upward from the body floor and a foot linking member that links the upper portions of the right and left front foot members and is disposed to partially overlap the right and left front foot members in the up and down direction. A closed section structure is formed by an opposing wall portion disposed at a position opposing the foot linking member in an up and down direction, right and left side wall portions continuously bent from both end portions of the opposing wall portion in a seat width direction and protruding to abut toward the foot linking member in the front foot member, and the foot linking member.

10 Claims, 20 Drawing Sheets

(51) Int. Cl.
*B60N 2/005* (2006.01)
*B60N 2/06* (2006.01)

(56) References Cited

U.S. PATENT DOCUMENTS

| | | | |
|---|---|---|---|
| 2014/0042789 A1* | 2/2014 | Kitaguchi | B60N 2/015 |
| | | | 297/344.1 |
| 2014/0333113 A1 | 11/2014 | Izawa et al. | |
| 2016/0137109 A1 | 5/2016 | Nagata et al. | |

FOREIGN PATENT DOCUMENTS

| | | | | |
|---|---|---|---|---|
| JP | H07-013560 U | 3/1995 | | |
| JP | H07-266944 A | 10/1995 | | |
| JP | H08-002297 A | 1/1996 | | |
| JP | 2009-262721 A | 11/2009 | | |
| JP | 2012-066800 A | 4/2012 | | |
| JP | 2014-004862 A | 1/2014 | | |
| JP | 2014-218227 A | 11/2014 | | |
| JP | 2016-094099 A | 5/2016 | | |
| JP | 2019-010904 A | 1/2019 | | |
| WO | WO-2011018930 A1 * | 2/2011 | ......... | B60N 2/01558 |
| WO | WO-2012002195 A1 * | 1/2012 | ......... | B60N 2/42709 |

* cited by examiner

FRONT ←——→ REAR

CONVEYANCE SEAT

CROSS REFERENCE TO RELATED APPLICATIONS

This application is the U.S. national stage entry of International Application No. PCT/JP2020/003124 filed under the Patent Cooperation Treaty and having a filing date of Jan. 29, 2020, which claims priority to Japanese Patent Application No. 2019-014222 having a filing date of Jan. 30, 2019 and Japanese Patent Application No. 2019-140877 having a filing date of Jul. 31, 2019, all of which are incorporated herein by reference.

TECHNICAL FIELD

The present invention relates to a conveyance seat and particularly to a conveyance seat which includes a seat support attached between a seat body and a body floor and supporting the seat body from below.

BACKGROUND ART

Conventionally, in vehicle seats used for automobiles or the like, there is known a vehicle seat including a seat support provided between a seat body and a body floor for the purpose of raising a seat surface position of the seat body to a predetermined height position from a body floor surface in order to ensure a good seating feeling for a seated occupant (for example, see PATENT LITERATURE 1).

The vehicle seat including the seat support described in PATENT LITERATURE 1 mainly includes right and left front leg portions which are attached to the body floor with a gap therebetween in a seat width direction, right and left rear leg portions which are arranged on the seat rear side in relation to the front leg portions, right and left cover members that extend in a front to back direction of the seat and link the front leg portion and the rear leg portion, and a cross member that extends in the seat width direction and links the right and left cover members.

In the above-described configuration, a closed section structure is formed by the cover member and the cross member in an inverse U-shaped cross-section in order to increase the stiffness of the seat support.

CITATION LIST

Patent Literature

PATENT LITERATURE 1: JP 2009-262721 A

SUMMARY OF INVENTION

Technical Problem

However, in the vehicle seat such as PATENT LITERATURE 1, since the right and left cover members and the cross member are attached to the right and left front leg portions and the right and left rear leg portions in order to increase the stiffness of the seat support, the number of components increases in the configuration and the seat support increases in size or weight.

Therefore, there has been a demand for a seat capable of decreasing the size or weight of the seat support while ensuring the stiffness of the seat support.

Further, there has been a demand for a vehicle seat capable of decreasing the number of components of the seat support and arranging components compactly.

The present invention has been made in view of the above-described problems and an object of the present invention is to provide a conveyance seat which can be decreased in size or weight while ensuring stiffness of a seat support in the conveyance seat including the seat support disposed between a seat body and a body floor.

Further, another object of the present invention is to provide a conveyance seat in consideration of a compact arrangement of components of a seat support and a decrease in the number of components.

Solution to Problem

The above-described problems are solved by a conveyance seat according to the present invention including: a seat body which includes a seat cushion corresponding to a seating portion; and a seat support which is attached to a body floor and supports the seat body from below, wherein the seat support includes: right and left foot members that are attached to the body floor with a gap therebetween in a seat width direction and extend to protrude upward from the body floor, and a foot linking member that links upper portions of the right and left foot members and is disposed to partially overlap the right and left foot members in an up and down direction or a front to back direction of the seat, wherein the foot member includes: an opposing wall portion which is disposed at a position opposing the foot linking member in the up and down direction or the front to back direction of the seat, and a side wall portion which is continuously bent from each of both end portions of the opposing wall portion and protrudes to abut toward the foot linking member, and wherein a closed section structure is formed by the opposing wall portion of the foot member, the each side wall portion of the foot member, and the foot linking member.

With the above-described configuration, it is possible to realize a conveyance seat which can be decreased in size or weight compared to a conventional one while ensuring the stiffness of the seat support.

Specifically, in order to ensure the stiffness of the seat support while ensuring a simple configuration of the seat support by the right and left foot members and the foot linking member, a closed section structure is formed by the opposing wall portion of the foot member, each side wall portion, and the foot linking member.

Therefore, not only the decrease in size or weight of the seat support, but also the compact arrangement of the components of the seat support and the decrease in the number of components are considered.

At this time, the foot member may include: a first opposing wall portion which is the opposing wall portion opposing the foot linking member in the up and down direction and a second opposing wall portion which is disposed at a position opposing the foot linking member in the front to back direction of the seat or the seat width direction. Then, a first closed section structure may be formed as the closed section structure and a second closed section structure may be formed by a second side wall portion protruding from each of both end portions of the second opposing wall portion of the foot member, the second opposing wall portion of the foot member, and the foot linking member.

With the above-described configuration, it is possible to further improve the stiffness of the seat support with a simple configuration.

At this time, both end portions of the foot linking member in the seat width direction may be formed to have a width larger than that of a center portion thereof in the seat width direction and are respectively attached to the foot member.

Further, a contact surface which is in contact with the foot member in the foot linking member may be provided with a reinforcement portion which extends from a center portion toward both end portions in the seat width direction.

Further, both end portions of a seat rear end of the foot linking member in the seat width direction may be formed to protrude toward a seat rear side in relation to a center portion thereof in the seat width direction and the reinforcement portion may extend in the seat width direction along the seat rear end of the foot linking member.

With the above-described configuration, it is possible to ensure the assembly stiffness of the seat support (an assembled portion of the foot member and the foot linking member), for example, against an external load applied from an intersection direction intersecting the front to back direction of the seat.

At this time, an outer peripheral portion of a portion in which the foot member and the foot linking member are in contact with each other is welded so that a weld mark may be formed in at least one of the foot member and the foot linking member and the weld mark and the reinforcement portion may be arranged at positions aligned in the seat width direction.

Since the reinforcement portion and the weld mark (welded reinforcement portion) are arranged at positions aligned in the seat width direction as described above, it is possible to further increase the assembly stiffness of the seat support.

At this time, the foot linking member may include an overhang portion which protrudes outward in the seat width direction in relation to the foot member and an outer peripheral portion of a portion in which the overhang portion of the foot linking member is in contact with the side wall portion of the foot member in the up and down direction may be welded.

Since the foot linking member includes an overhang portion (a remaining margin) as described above, it is possible to absorb a variation in the dimensions of the foot linking member when assembling the foot member and the foot linking member and to ensure quality for the assembly stiffness while obtaining satisfactory assembly workability.

At this time, the seat support may include a front foot member as the foot member and a rear foot member which are attached to the body floor with a gap therebetween in the front to back direction of the seat, the foot linking member may link the right and left front foot members, a reinforcement foot member that is disposed at a position opposing the rear foot member in the up and down direction or the front to back direction of the seat may be attached to the rear foot member on the arrangement side of a belt anchor locking a seat belt in the right and left rear foot members, and a closed section structure may be formed by the rear foot member and the reinforcement foot member.

With the above-described configuration, when a load is applied to the seat support during a vehicle collision, since a portion to which a particularly high load is applied to the seat support (the rear foot member on the arrangement side of the belt anchor) is reinforced pinpointly, it is possible to improve the stiffness while suppressing an increase in size or weight of the seat support.

At this time, the conveyance seat may further include: a lower rail which is attached to an upper surface of the foot member in the seat support; and an upper rail which is supported by the lower rail to be relatively movable and supports the seat body from below, an upper portion of the foot member may be disposed to be sandwiched between the lower rail and the foot linking member in the up and down direction, and a portion having the lower rail attached thereto and a portion having the foot linking member attached thereto in the foot member may be arranged at an overlapping position in the up and down direction.

With the above-described configuration, since the existing component (the lower rail) of the seat is used while decreasing the number of components of the seat support compared to a conventional one, it is possible to increase the assembly stiffness of the seat support (particularly, the foot member).

Further, the above-described problems are solved by a conveyance seat according to the present invention including: a seat body which includes a seat cushion corresponding to a seating portion; a seat support which is attached to a body floor and supports the seat body from below; and a seat support frame which is disposed between the seat body and the seat support in an up and down direction and supports the seat body from below, wherein the seat support includes: right and left foot members that are attached to the body floor with a gap therebetween in a seat width direction and extend to protrude upward from the body floor, and a foot linking member that links upper portions of the right and left foot members and are arranged to partially overlap the right and left foot members in the up and down direction, wherein an upper portion of the foot member is linked to the seat support frame, and wherein the upper portion of the foot member, the foot linking member, and the seat support frame are arranged to partially overlap each other in the up and down direction.

With the above-described configuration, it is possible to realize a conveyance seat which can be decreased in size or weight compared to a conventional one while ensuring the stiffness of the seat support.

Specifically, in order to ensure the stiffness of the seat support while ensuring a simple configuration of the seat support by the right and left foot members and the foot linking member, the upper portion of the foot member, the foot linking member, and the seat support frame are arranged to partially overlap each other in the up and down direction.

Therefore, not only the decrease in size or weight of the seat support, but also the compact arrangement of the components of the seat support and the decrease in the number of components are considered.

Advantageous Effects of Invention

According to the present invention, it is possible to realize the conveyance seat which can be decreased in size or weight compared to a conventional one while ensuring the stiffness (assembly stiffness) of the seat support.

Further, according to the above-described invention, the compact arrangement of the components of the seat support and the decrease in the number of components are also considered.

Further, according to the above-described invention, it is possible to absorb a variation in the dimensions of the foot linking member when assembling the foot member and the foot linking member and to ensure quality for the assembly stiffness while obtaining satisfactory assembly workability.

Further, according to the above-described invention, since the existing components of the seat are used while decreasing the number of components of the seat support compared to a conventional one, it is possible to improve the assembly stiffness of the seat support.

DESCRIPTION OF EMBODIMENTS

Hereinafter, an embodiment of the present invention will be described with reference to FIG. 1 to FIGS. 8A and 8B.

This embodiment relates to a conveyance seat including a seat support attached between a seat body and a body floor, the seat support includes right and left foot members that are attached to a body floor with a gap therebetween in a seat width direction and extend upward from a body floor and a foot linking member that links upper portions of the right and left foot members and are arranged to partially overlap the right and left foot members in the up and down direction and the front to back direction of the seat, the foot member includes an opposing wall portion which is disposed at a position opposing the foot linking member in the up and down direction and the front to back direction of the seat and right and left side wall portions which are continuously bent from both end portions of the opposing wall portion in the seat width direction and protrude to abut toward the foot linking member, and a closed section structure is formed by the opposing wall portion of the foot member, the right and left side wall portions of the foot member, and the foot linking member.

Additionally, the side on which an occupant sits with respect to the seat back of the conveyance seat is the seat front side.

A conveyance seat S of this embodiment is used, for example, as a front seat of an automobile.

Figure 1:
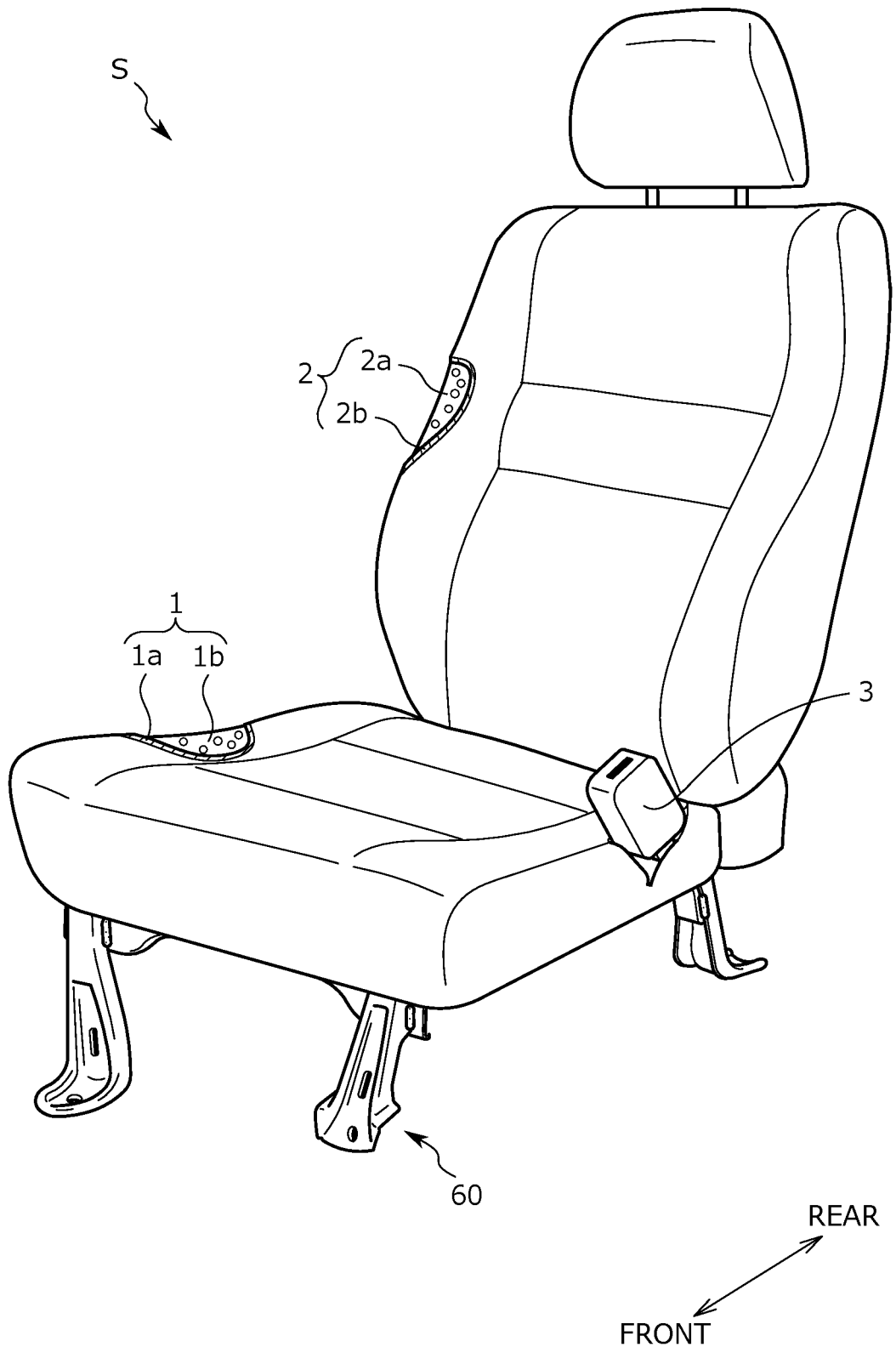
FIG. 1 is an external perspective view of a conveyance seat of this embodiment.
Figure 2:
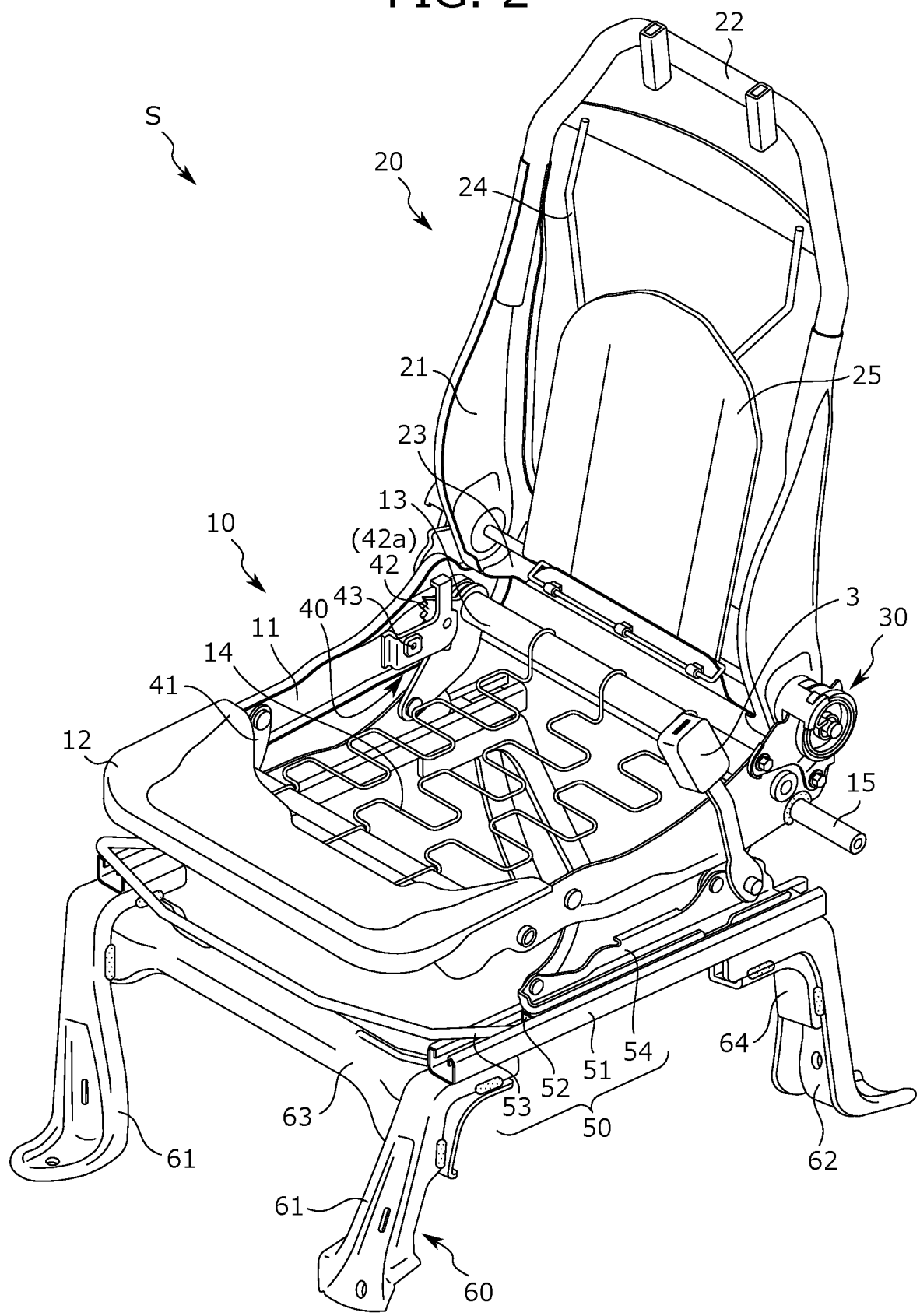
FIG. 2 is a perspective view of a seat frame which is a skeleton.

The conveyance seat S mainly includes a seat body which includes a seat cushion 1 and a seat back 2 as illustrated in FIG. 1, a reclining device 30 which links the seat back 2 to the seat cushion 1 to be rotatable, a height link device 40 which links the seat body to a body floor to be elevatable, and a rail device 50 which supports the seat body to the body floor to be movable forward and backward as illustrated in FIG. 2.

Further, the conveyance seat S further includes a seat support 60 which is attached onto the body floor and supports the seat body from below as illustrated in FIGS. 1 and 2. Specifically, the seat support 60 is disposed between the rail device 50 and the body floor in the up and down direction.

As illustrated in FIG. 1, the seat cushion 1 is a seating portion which supports an occupant from below and has a configuration in which a cushion pad 1a is placed on a cushion frame 10 corresponding to a skeleton illustrated in FIG. 2 and the cushion pad 1a is covered with a skin material 1b from above.

The seat back 2 is a backrest portion which supports the back of the occupant from behind and has a configuration in which a cushion pad 2a is placed on a back frame 20 corresponding to a skeleton and illustrated in FIG. 2 and is covered with a skin material 2b.

Additionally, a belt anchor 3 for locking a seat belt is attached to the outside of the seat cushion 1 in the seat width direction as illustrated in FIG. 2.

Figure 3:
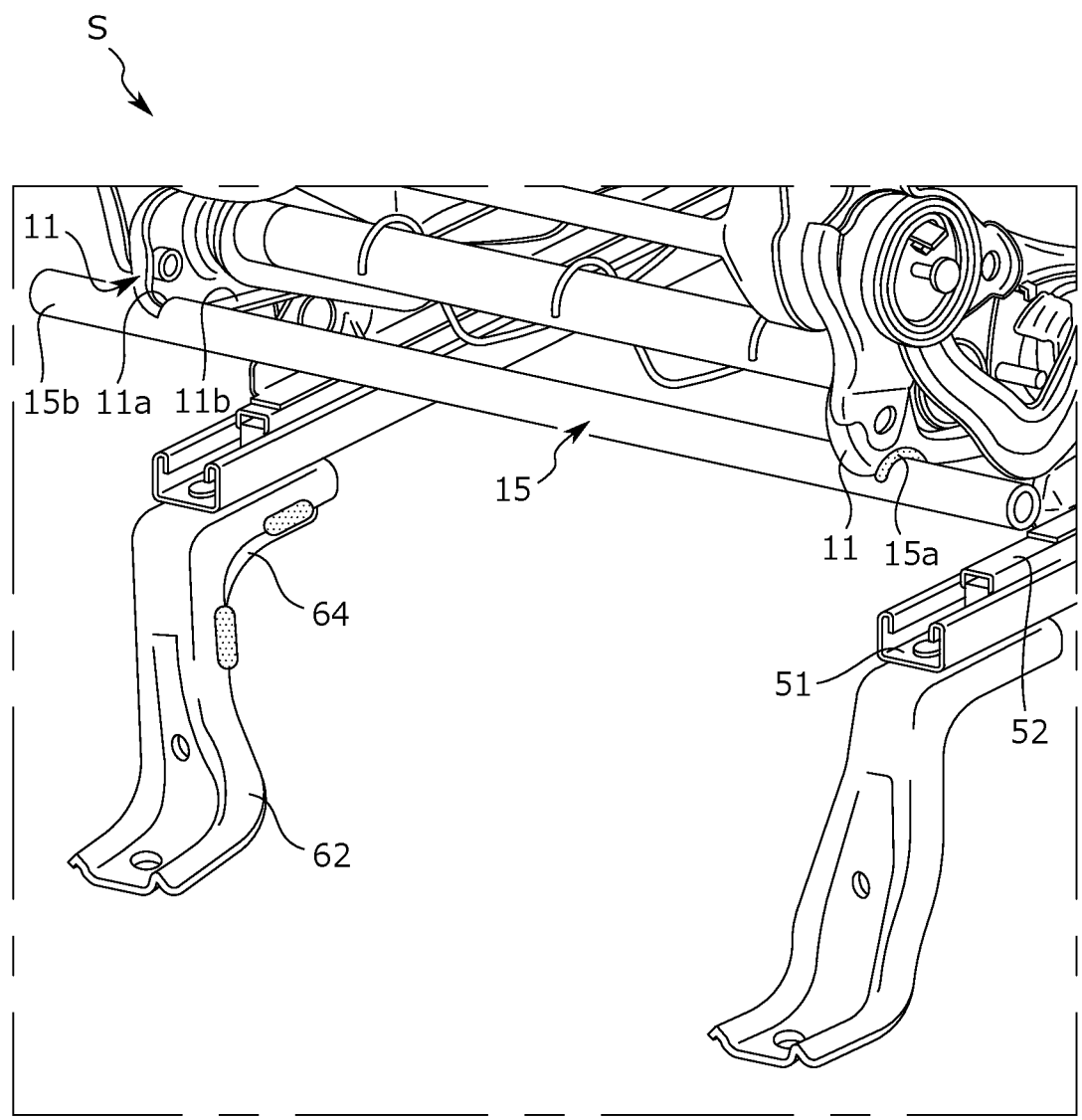
FIG. 3 is a perspective view of the seat frame as viewed from a different angle and is an enlarged view of a main part.
Figure 4:
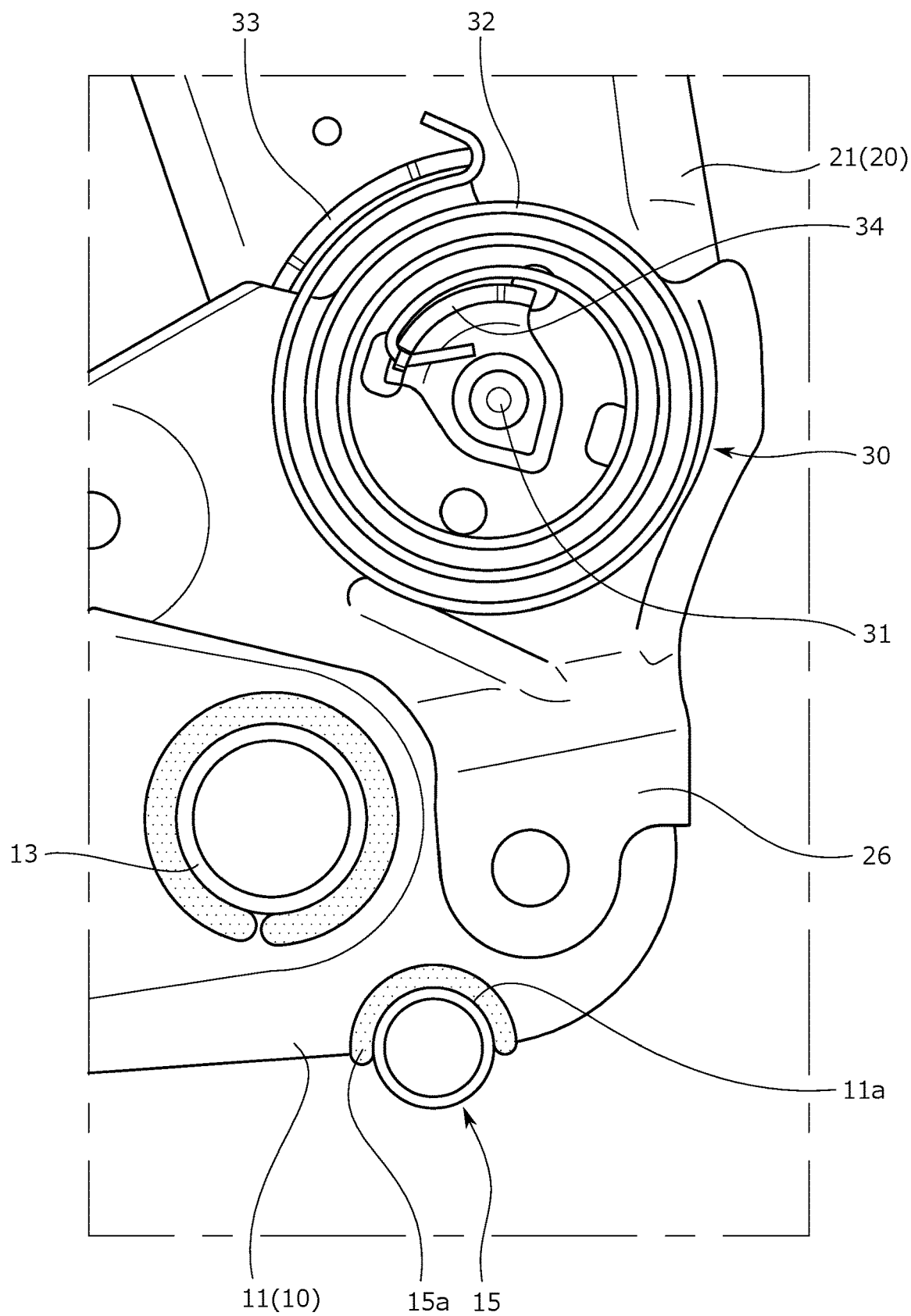
FIG. 4 is a side view of the seat frame and is an enlarged view of a main part showing a reinforcement pipe.

The cushion frame 10 is formed as a substantially rectangular frame-shaped body as illustrated in FIGS. 2 to 4 and mainly includes side frames 11 which are arranged on the right and left sides, a plate-shaped pan frame 12 which links the front portion of each side frame 11, a pipe-shaped rear linking frame 13 which links the rear portion of each side frame 11, a plurality of elastic springs 14 which are hooked to each of the pan frame 12 and the rear linking frame 13 and extend in a snake shape, and a pipe-shaped reinforcement linking frame 15 which is behind the rear linking frame 13 and links the rear portion of each side frame 11.

The side frame 11 is a metal plate member that extends in the front to back direction of the seat and has a substantially I-shaped longitudinal cross-section, the reclining device 30 is attached to the rear portion of the side frame, and the rail device 50 is attached to the lower portion of the side frame through the height link device 40.

The back frame 20 is formed as a substantially rectangular frame as illustrated in FIGS. 2 to 4 and mainly includes back side frames 21 which are arranged on the right and left sides, an inverse U-shaped upper frame 22 which links the upper end portion of each back side frame 21, a plate-shaped lower frame 23 which links the lower end portion of each back side frame 21, a plurality of elastic springs 24 which are respectively hooked to each of the upper frame 22 and the lower frame 23 and extend in the up and down direction, and a plate-shaped frame 25 that is supported by the elastic spring 24.

The back side frame 21 is a metal plate member that extends in the up and down direction and has a substantially U-shaped cross-section and the lower end portion of the back side frame is linked to the rear end portion of the side frame 11 through the attachment bracket 26 and the reclining device 30. In such a state, the back frame 20 is relatively rotatable with respect to the cushion frame 10.

As illustrated in FIGS. 2 and 4, the reclining device 30 can be switched between a locked state in which the rotational operation of the back frame 20 is locked and an unlocked state and can adjust the standing posture of the back frame 20 by releasing the locked state using a reclining operating lever (not illustrated) from a state in which the back frame 20 is locked in a predetermined standing posture.

Specifically, the reclining device 30 mainly includes a back rotating shaft 31 and a spiral spring 32 which biases the back frame 20 to rotate forward about the back rotating shaft 31.

The back rotating shaft 31 is pivotally supported on the side of each of the back frame 20 (the back side frame 21) and the cushion frame 10 (the side frame 11) in the seat width direction.

In the spiral spring 32, one end portion is locked to a spring locking bracket 33 attached to the outer surface of the back side frame 21 and the other end portion is locked to a spring locking member 34 attached to the outer surface of the side frame 11.

As illustrated in FIG. 2, the height link device 40 includes right and left front links 41 which are attached between the cushion frame 10 and the rail device 50 and are arranged on the seat front side and right and left rear links 42 which are arranged on the seat rear side and the rear link 42 can adjust the height of the seat body while serving as a drive link.

In the right rear link 42, a part of the outer peripheral portion of the link portion on the side of the cushion frame 10 (the side frame 11) is provided with a sector gear portion 42*a* which is a gear and meshes with a pinion gear provided in a brake unit (not illustrated).

Further, as illustrated in FIG. 2, the height link device 40 includes a brake rotating shaft 43 which is pivotally supported on the side surface of the side frame 11 in the seat width direction and protrudes outward, a brake unit (not illustrated) which is rotatably attached through the brake rotating shaft 43 and regulates the elevating operation of the seat body, and a height operating lever (not illustrated) which is rotatably attached through the brake rotating shaft 43 and the brake unit and elevates the seat body.

The brake unit is attached to the outer surface of the side frame 11.

In the above-described configuration, when the height operating lever (not illustrated) is operated, the pinion gear rotates together with the brake rotating shaft 43 and the meshing position between the pinion gear and the sector gear portion 42*a* changes. Further, the right rear link 42 formed in the sector gear portion 42*a* rotates and the left rear link 42 and the right and left front links 41 also rotate to follow the rotation of the right rear link 42. Accordingly, the seat body is elevated so that the seat height is adjusted.

As illustrated in FIG. 2, the rail device 50 mainly includes right and left lower rails 51 which are fixed to the upper surface of the seat support 60 and extend in the front to back direction of the seat, right and left upper rails 52 which are supported to be slidable along the lower rails 51, a locking member (not illustrated) that locks the upper rail 52 so as not to be slidable, and a rail operating lever 53 which releases a locked state of the locking member.

The upper rail 52 is formed as an elongated body which slides along the lower rail 51 while being inserted into a storage space of the lower rail 51 and an upper end portion of the upper rail is linked to the side of the cushion frame 10 through a link bracket 54.

The link bracket 54 is a member that is formed as a metal plate member extending in the front to back direction of the seat and having an L-shaped longitudinal cross-section and links the upper rail 52 and the links 41 and 42 on the side of the cushion frame 10 in the up and down direction.

Further, the belt anchor 3 for locking the seat belt is attached to the left link bracket 54 which is on the side different from the right rear link 42 (the drive link) in the right and left link brackets 54.

Figure 5:
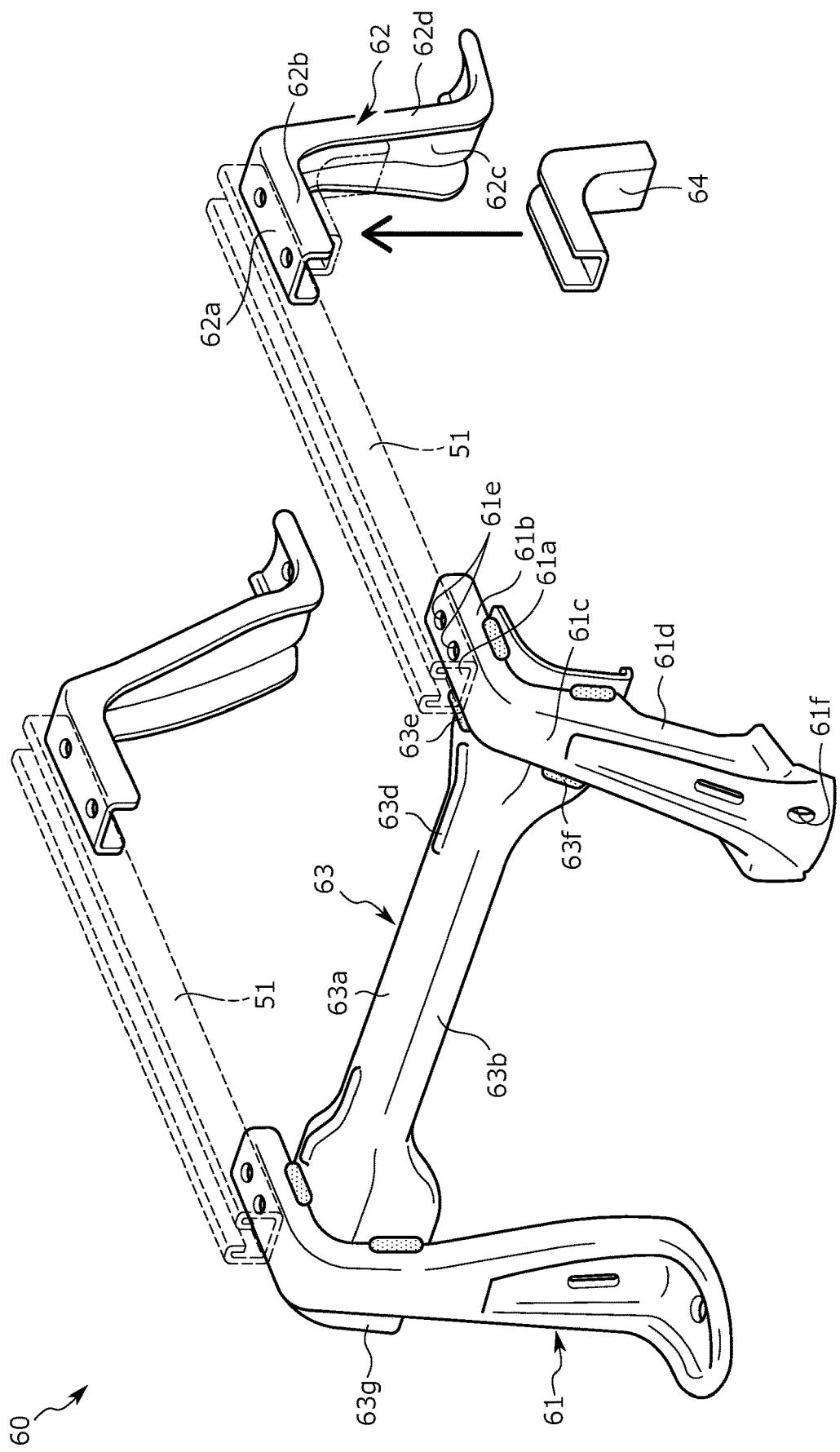
FIG. 5 is a perspective view of a seat support.

The seat support 60 is a member that raises a seat surface position of the seat body to a predetermined height position as illustrated in FIGS. 2 and 5 and specifically mainly includes right and left front foot members 61 and right and left rear foot members 62 that are attached onto the body floor with a gap therebetween in the seat width direction and protrude upward from the body floor, a foot linking member 63 that links the upper portions of the right and left front foot members 61, and a reinforcement foot member 64 that is attached to the left rear foot member 62 and is disposed at a position opposing the rear foot member 62 in the up and down direction.

Additionally, the reinforcement foot member 64 is attached to the left rear foot member 62 that is on the arrangement side of the belt anchor 3 in the right and left rear foot members 62.

Figure 6:
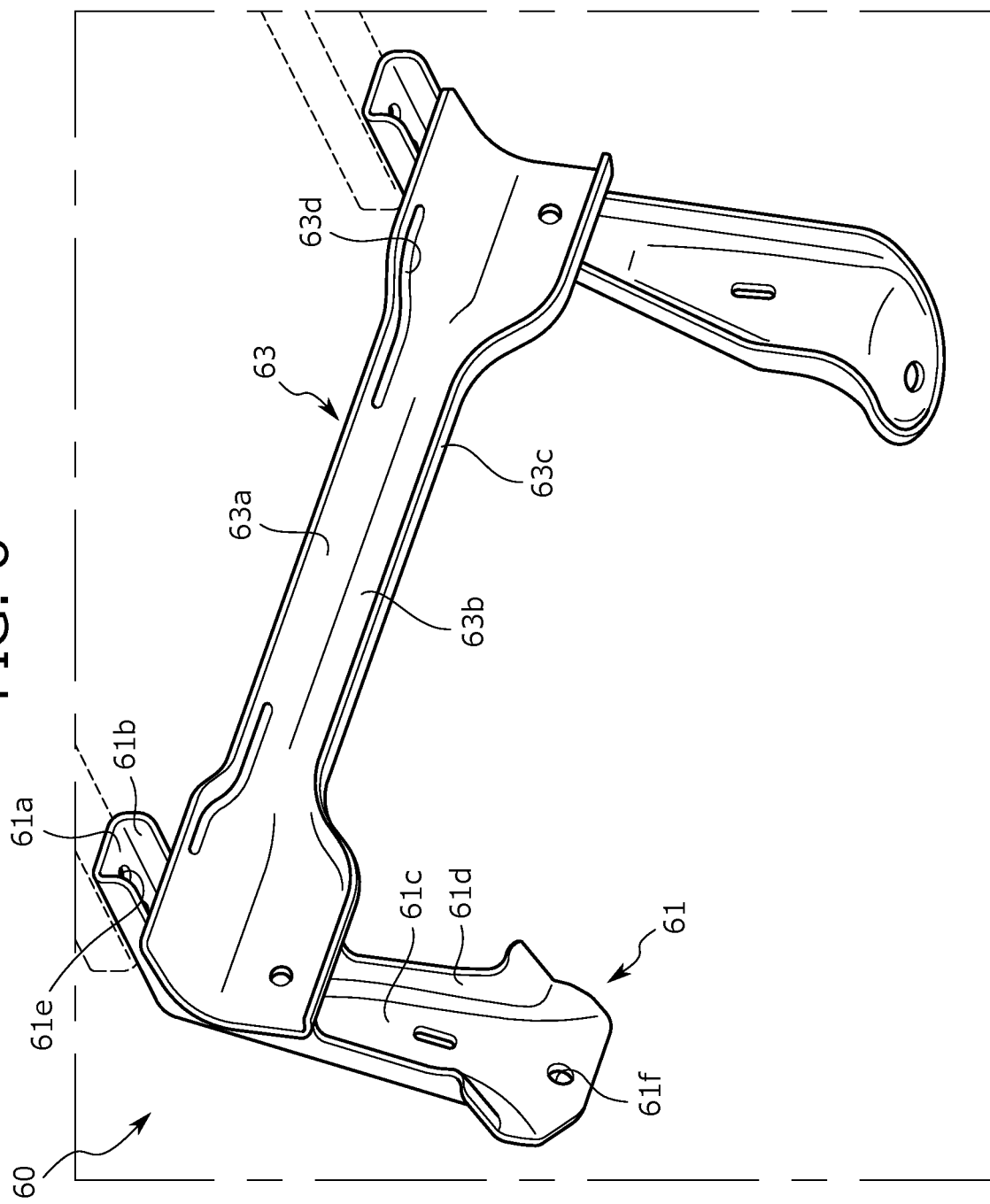
FIG. 6 is a perspective view of the seat support as viewed from a separate angle and is an enlarged view of a main part.
Figure 7:
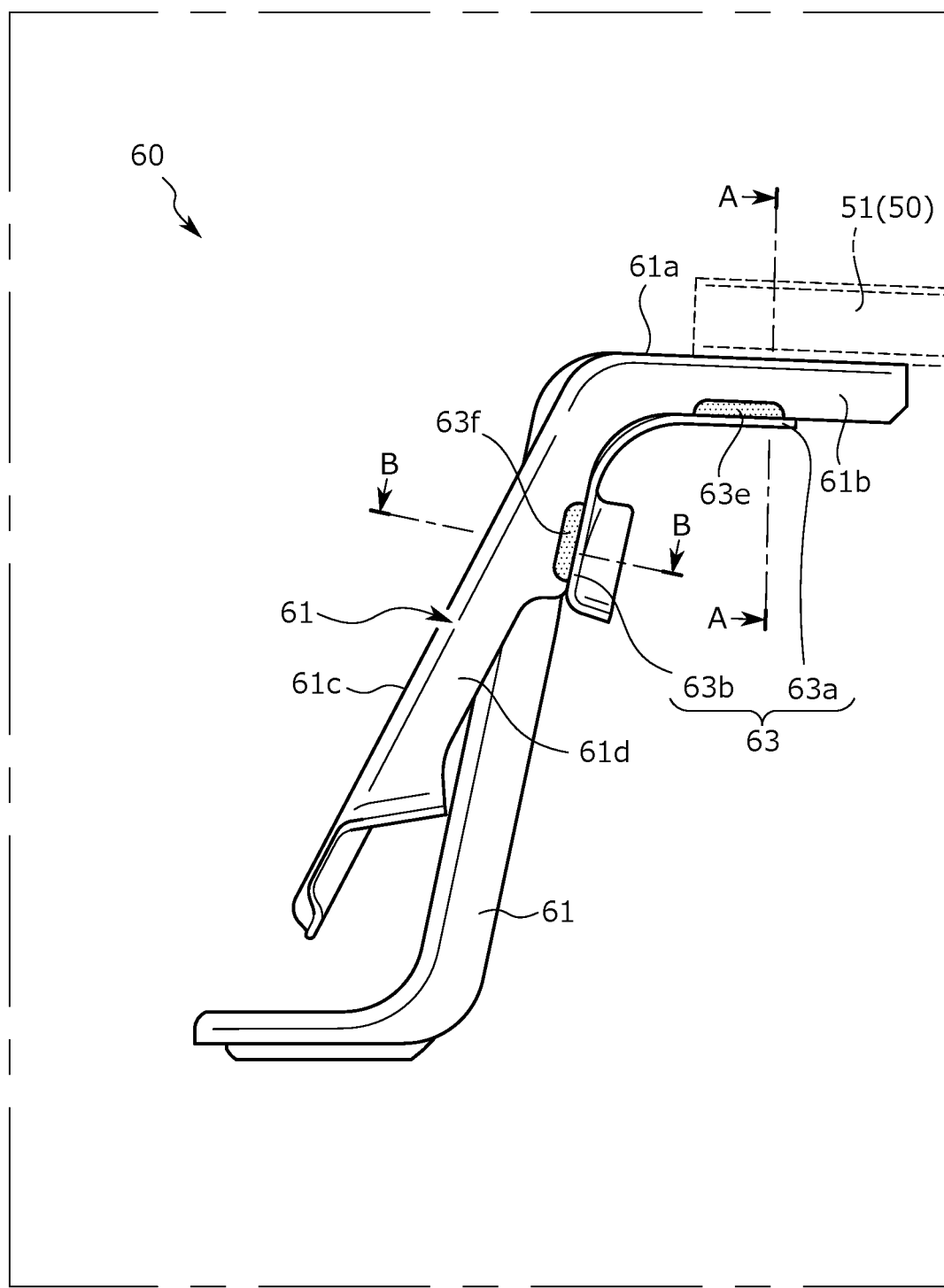
FIG. 7 is a side view of the seat support and is an enlarged view of a main part.

As illustrated in FIGS. 5 to 7, the front foot member 61 is a member having a substantially U-shaped cross section that is long in the up and down direction for attaching on the body floor and is disposed so that the upper portion is sandwiched between the lower rail 51 and the foot linking member 63 in the up and down direction and the lower portion is in contact with the body floor surface.

Additionally, the rear foot member 62 has the same configuration as that of the front foot member 61 and the front foot member 61 and the rear foot member 62 are arranged so as to be front-rear symmetrical with respect to the seat body.

The front foot member 61 includes a first opposing wall portion 61*a* which extends from the lower portion toward the upper portion while being inclined toward the rear side of the seat and is disposed at a position opposing the foot linking member 63 in the up and down direction at the upper end portion thereof and right and left first side wall portions 61*b* which are continuously bent downward from both right and left end portions of the first opposing wall portion 61*a* and protrude to abut toward the foot linking member 63.

Further, the front foot member 61 includes a second opposing wall portion 61*c* which extends in the up and down direction and is disposed at a position opposing the foot linking member 63 in the front to back direction of the seat and right and left second side wall portions 61*d* which are continuously bent backward from both right and left end portions of the second opposing wall portion 61*c* and protrude to abut toward the foot linking member 63.

The first opposing wall portion 61*a* is a wall portion which extends in the front to back direction of the seat and has a horizontal plane, the second opposing wall portion 61*c* is a wall portion which extends in the up and down direction while being inclined toward the front side of the seat and has an inclined plane, and the first opposing wall portion 61*a* and the second opposing wall portion 61*c* are formed to be continuous to each other.

The upper surface of the first opposing wall portion 61a is provided with a rail attachment portion 61e for attaching the front portion of the lower rail 51 and the inclined plane of the second opposing wall portion 61c is provided with a floor attachment portion 61f for attaching on the body floor.

The rail attachment portion 61e includes an attachment hole penetrating in the up and down direction and is linked to the lower rail 51 using a fastening bolt and a fastening nut (not illustrated).

Similarly, the floor attachment portion 61f also includes an attachment hole penetrating the second opposing wall portion 61c and is attached to the body floor using a fastening bolt or the like (not illustrated).

Additionally, the floor attachment portion 61f is formed on a recessed portion (reinforcement recess) recessed one step from the inclined plane of the second opposing wall portion 61c to increase the attachment stiffness with the body floor.

As illustrated in FIGS. 5 to 7, the foot linking member 63 is a reinforcement member having a substantially L-shaped longitudinal cross-section that is long in the seat width direction for linking the right and left front foot members 61 and is disposed to partially overlap the right and left front foot members 61 in the up and down direction and the front to back direction of the seat.

Specifically, the foot linking member 63 includes an upper wall portion 63a which is disposed at a position opposing the first opposing wall portion 61a in the front foot member 61, a front wall portion 63b which is continuously bent downward from the front end portion of the upper wall portion 63a and is disposed at a position opposing the second opposing wall portion 61c, and a bottom wall portion 63c which protrudes while being continuously bent backward from the lower end portion of the front wall portion 63b.

Each of the upper wall portion 63a and the front wall portion 63b is formed so that both end portions of the seat width direction have a width larger than that of the center portion and both end portions of each of them are attached to the front foot member 61 by welding.

Specifically, both end portions of the rear end of the upper wall portion 63a in the seat width direction are formed to protrude toward the seat rear side in relation to the center portion and both end portions of the lower end of the front wall portion 63b in the seat width direction are formed to protrude downward in relation to the center portion.

An upper surface which is in contact with the front foot member 61 (the first opposing wall portion 61a) in the upper wall portion 63a is provided with right and left reinforcement beads 63d (reinforcement portions) which extend from the center portion toward both end portions in the seat width direction. The reinforcement bead 63d extends along the seat rear end of the upper wall portion 63a while meandering in the seat width direction.

Further, an outer peripheral portion of a portion which is in contact with the front foot member 61 (the right and left first side wall portions 61b) in the upper wall portion 63a is welded so that a first weld mark 63e is formed in the outer peripheral portion (at least one of the upper wall portion 63a and the front foot member 61).

In the description above, the reinforcement bead 63d and the first weld mark 63e are arranged at positions aligned in the seat width direction.

Additionally, an outer peripheral portion of a portion which is in contact with the front foot member 61 (the right and left second side wall portions 61d) in the front wall portion 63b is also welded so that a second weld mark 63f is formed in the outer peripheral portion (at least one of the front wall portion 63b and the front foot member 61).

Figure 8A:
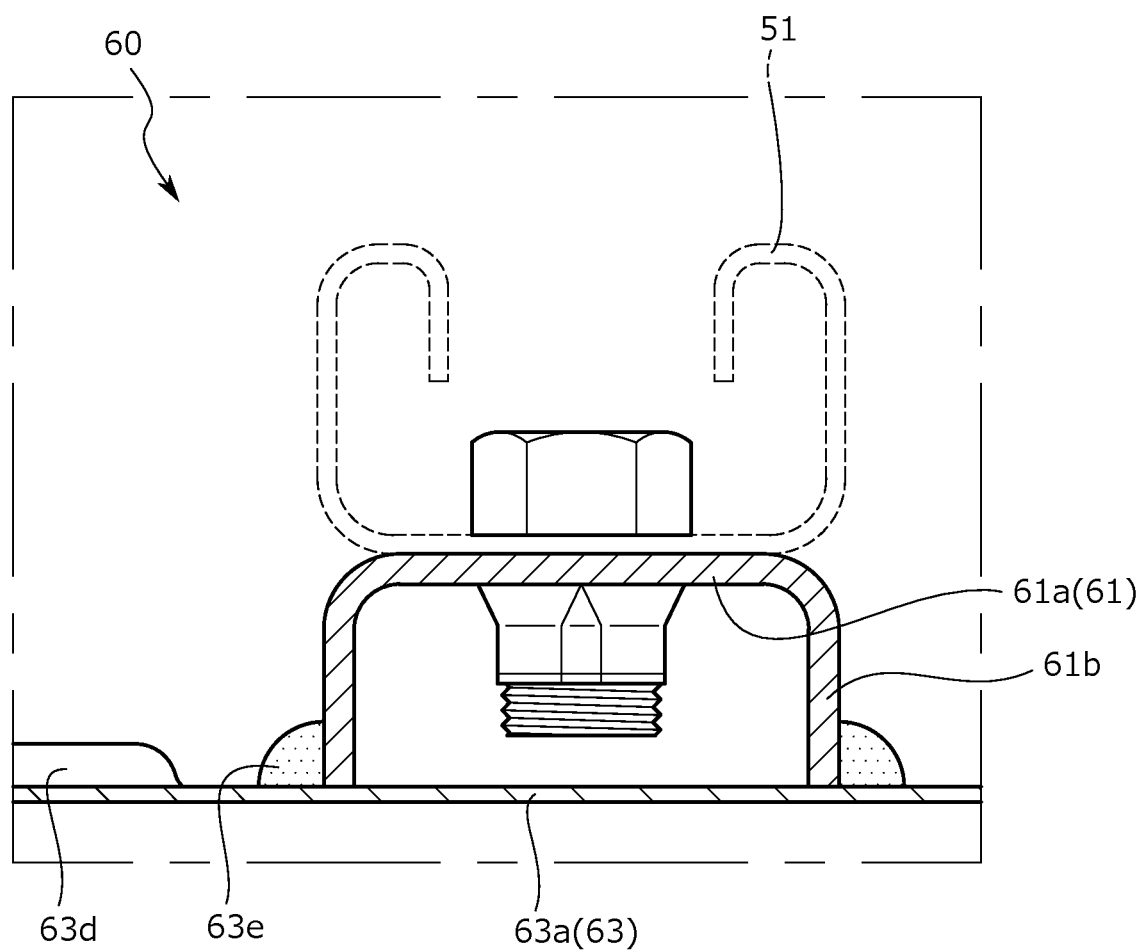
FIG. 8A is a cross-sectional view taken along a line A-A of FIG. 7 and is a view illustrating a closed section structure of the seat support.

In the above-described configuration, as illustrated in FIGS. 7 and 8A, the first opposing wall portion 61a and the right and left first side wall portions 61b of the front foot member 61 overlap the upper wall portion 63a of the foot linking member 63 in the up and down direction so that a closed section structure (a first closed section structure) is formed.

Figure 8B:
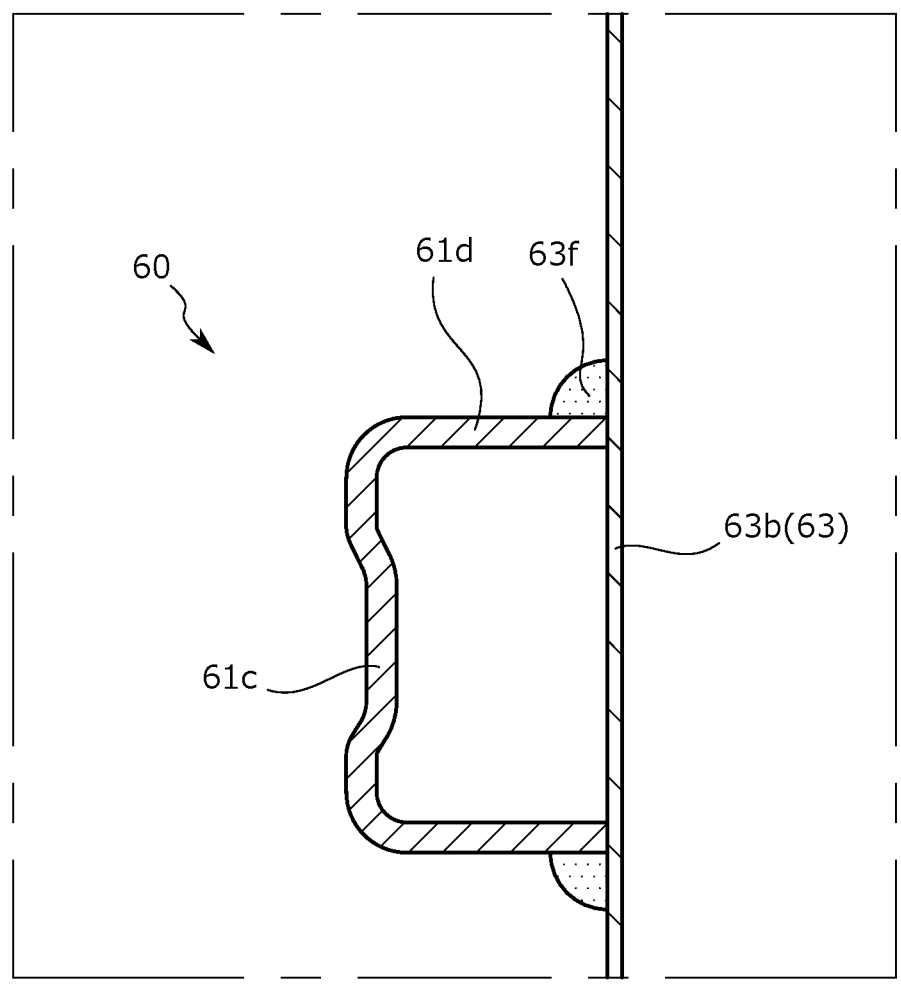
FIG. 8B is a cross-sectional view taken along a line B-B of FIG. 7 and is a view illustrating the closed section structure of the seat support.

Further, as illustrated in FIGS. 7 and 8B, the second opposing wall portion 61c and the right and left second side wall portions 61d of the front foot member 61 overlap the front wall portion 63b of the foot linking member 63 in the front to back direction of the seat so that a second closed section structure is formed.

Therefore, it is possible to improve the stiffness of the seat support 60 with a simple configuration.

Further, in the above-described configuration, as illustrated in FIG. 5, the rear foot member 62 having an inverse U-shaped cross-section and the reinforcement foot member 64 having a U-shaped cross-section overlap each other so that a middle structure is formed.

Specifically, the first opposing wall portion 62a and the right and left first side wall portions 62b of the rear foot member 62 overlap the reinforcement foot member 64 in the up and down direction so that a closed section structure (a third closed section structure) is formed.

Further, the second opposing wall portion 62c and the right and left second side wall portions 62d of the rear foot member 62 overlap the reinforcement foot member 64 in the front to back direction of the seat so that a fourth closed section structure is formed. Furthermore, the third closed section structure and the fourth closed section structure are continuously formed.

Therefore, it is possible to further improve the stiffness of the seat support 60.

Further, in the above-described configuration, as illustrated in FIG. 5, an upper surface portion having the lower rail 51 attached thereto and a bottom surface portion having the foot linking member attached thereto in the front foot member 61 are arranged at an overlapping position in the up and down direction.

Since an existing component (the lower rail 51) is used as described above, it is possible to improve the assembly stiffness of the seat support 60 without increasing the number of components of the seat support 60.

Further, in the above-described configuration, as illustrated in FIG. 5, since the foot linking member 63 includes an overhang portion 63g which protrudes outward in the seat width direction in relation to the front foot member 61, an outer peripheral portion of a portion where the overhang portion 63g is in contact with each of the side wall portions 61b and 61d of the front foot member 61 in the up and down direction is welded.

Since the foot linking member 63 includes the overhang portion 63g (a remaining margin) as described above, it is possible to absorb a variation in the dimensions of the foot linking member 63 when assembling the front foot member 61 and the foot linking member 63 and to obtain uniform quality.

Detail of Reinforcement Linking Frame

As illustrated in FIGS. 2 to 4, the reinforcement linking frame 15 is a link pipe which reinforces the rear portion of the cushion frame 10 and specifically is provided as a reinforcement structure to cope with the lateral impact load from the outside.

The reinforcement linking frame 15 is disposed on the seat rear side in relation to the rear linking frame 13, is disposed therebelow, and extends to link the right and left side frames 11 while being in contact with notch portions 11a formed at the lower ends of the right and left side frames 11.

Specifically, an outer peripheral portion of a portion where the reinforcement linking frame 15 and the notch portion 11a are in contact with each other is welded so that a weld mark 15a is formed in the outer peripheral portion.

With the above-described configuration, since the reinforcement linking frame 15 is conventionally linked to penetrate the side surfaces of the right and left side frames 11, the side frame 11 has been enlarged in the front to back direction of the seat and the up and down direction in order to ensure the attachment space of the reinforcement linking frame 15 (for example, see JP 2012-66800 A). According to the present invention, it is possible to suppress an increase in size of the seat (an increase in size of the cushion frame 10).

Further, in the above-described configuration, as illustrated in FIG. 3, the lower end of the side frame 11 is provided with a reinforcement portion 11b (a reinforcement flange) which protrudes toward one side (the inside) of the seat width direction.

Therefore, it is possible to increase the assembly stiffness of the side frame 11 and the reinforcement linking frame 15.

Further, in the above-described configuration, as illustrated in FIG. 3, the reinforcement linking frame 15 includes an overhang portion 15b which protrudes outward in the seat width direction in relation to the right and left side frames 11.

Therefore, since the reinforcement linking frame 15 has a remaining margin in addition to increasing the stiffness of the reinforcement linking frame 15, it is possible to absorb a variation in the dimensions of the reinforcement linking frame 15 when linking the right and left side frames 11 and to obtain uniform quality.

Second Embodiment of Conveyance Seat

Next, a second embodiment of the conveyance seat will be described with reference to FIGS. 9 to 14.

Additionally, the description of the contents overlapping with the above-described conveyance seat S will be omitted.

A conveyance seat S2 of the second embodiment includes a seat support 160 instead of the seat support 60.

The seat support 160 mainly includes right and left front foot members 161 and right and left rear foot members 162, a foot linking member 163 that links the upper portions of the right and left front foot members 161, and a reinforcement foot member 164 that is attached to the left rear foot member 162 and is disposed at a position opposing the rear foot member 62 in the up and down direction.

The front foot member 161 includes, as illustrated in FIGS. 9 to 12, a first opposing wall portion 161a, right and left first side wall portions 161b, a second opposing wall portion 161c, and right and left second side wall portions 161d.

An upper surface of the first opposing wall portion 161a is provided with a rail attachment portion 161e and an inclined plane of the second opposing wall portion 161c is provided with a floor attachment portion 161f.

The foot linking member 163 includes an upper wall portion 163a, a front wall portion 163b, and a bottom wall portion 163c which protrudes while being continuously bent backward from the lower end portion of the front wall portion 163b.

An upper surface which is in contact with the front foot member 161 in the upper wall portion 163a is provided with a first reinforcement bead 163d (a reinforcement portion) which extends to be long in the seat width direction.

Further, a curved surface which is in contact with the front foot member 161 in the front wall portion 163b is provided with right and left second reinforcement beads 163h which extend from the center portion toward both end portions in the seat width direction.

Figure 10:
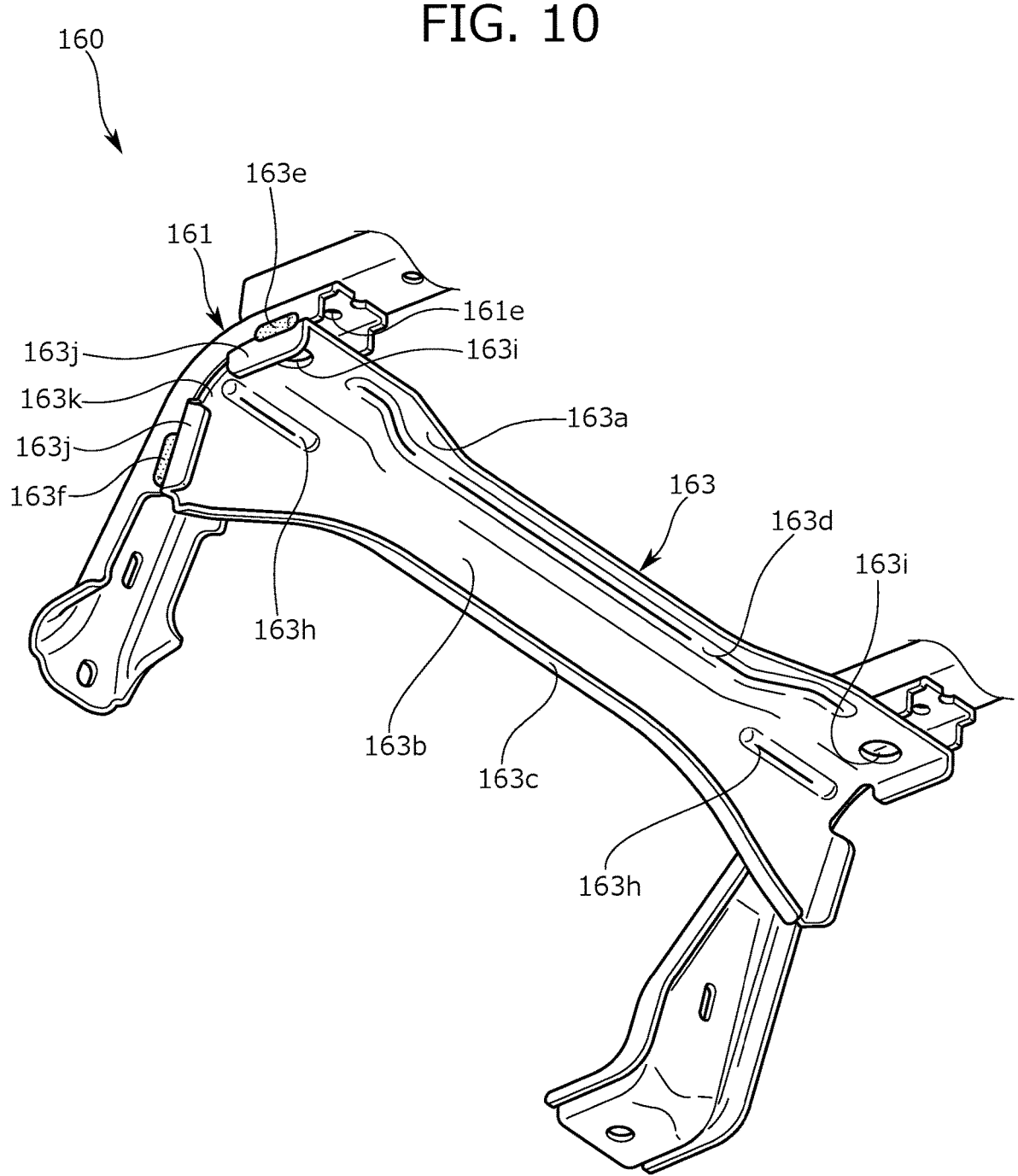
FIG. 10 is a perspective view of the seat support as viewed from a different angle and is a view illustrating a front foot member.
Figure 11:
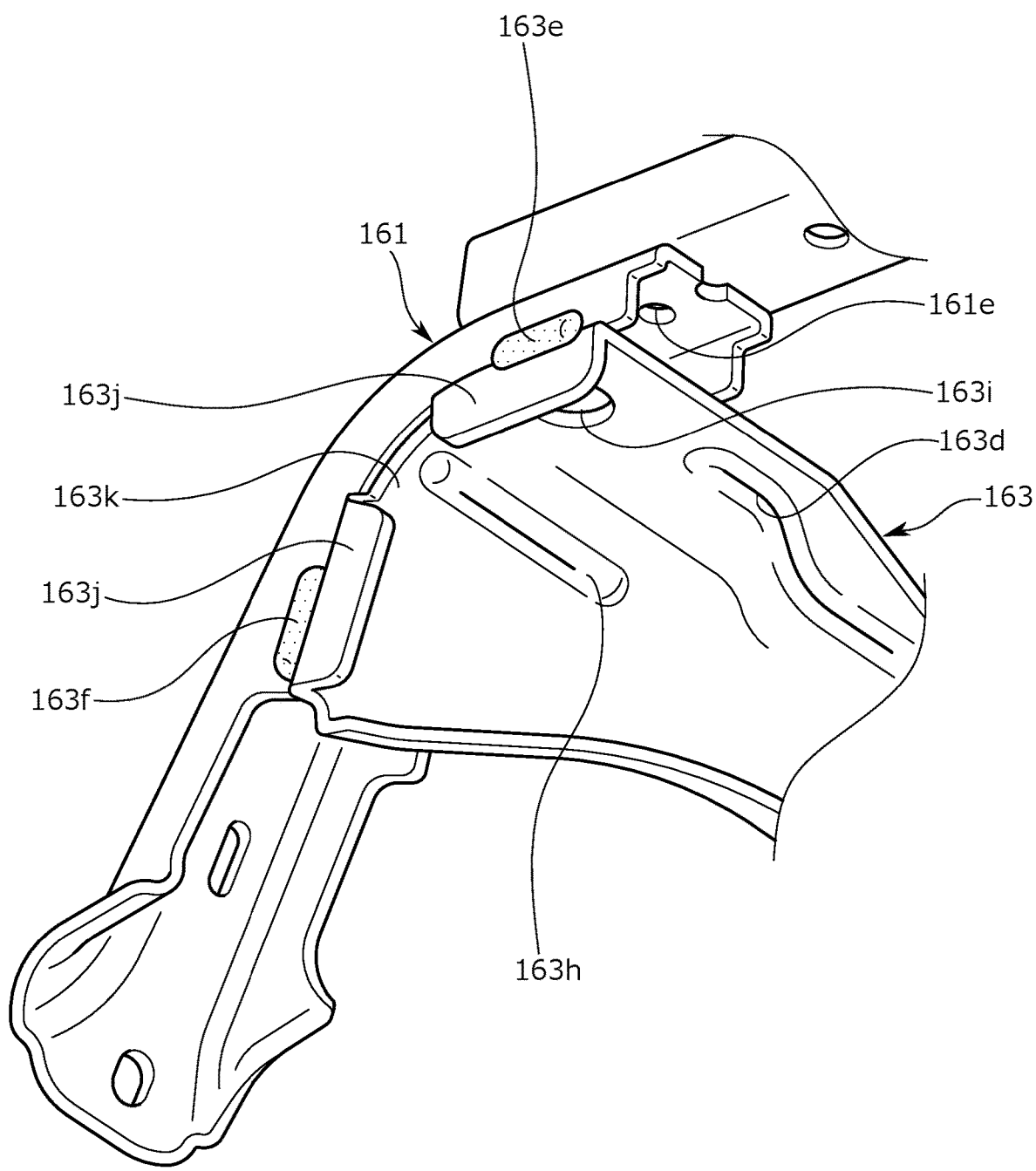
FIG. 11 is an enlarged view of a main part of FIG. 10.
Figure 12:
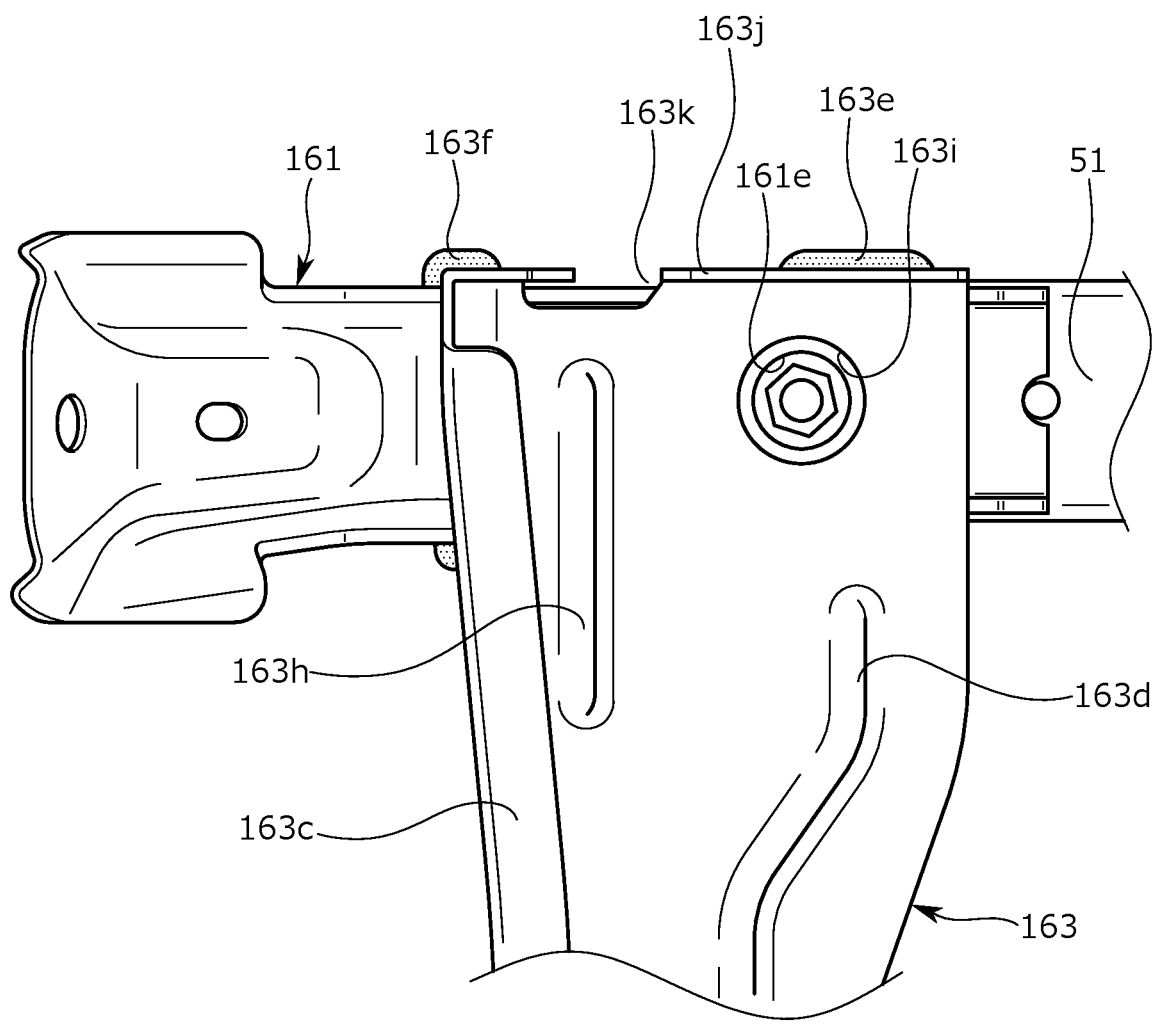
FIG. 12 is a bottom view of the seat support and is a view illustrating a front foot member.

As illustrated in FIGS. 10 to 12, an upper surface of the upper wall portion 163a is provided with a through hole 163i formed at a position opposing the rail attachment portion 161e. The through hole 163i is a hole penetrating in the up and down direction and functions as a tool hole when fastening the lower rail 51 and the front foot member 161 using a fastening bolt and a fastening nut (not illustrated).

Both end portions of the upper wall portion 163a and the front wall portion 163b in the seat width direction are provided with right and left bent portions 163j which protrude while being continuously bent downward from the both end portions.

Further, a notch portion 163k which is notched inward in the seat width direction is formed at the substantially center portion of the bent portion 163j in the extension direction.

Since the notch portion 163k is formed, the bent portion 163j is divided into two parts in the front to back direction of the seat and a space is formed between two divided bent portions 163j.

In the above-described configuration, as illustrated in FIGS. 10 to 12, an upper surface of the upper wall portion 163a of the foot linking member 163 is provided with the through hole 163i formed at a position opposing the rail attachment portion 161e.

Therefore, it is possible to improve the assembly workability with the lower rail 51 while suppressing a decrease in stiffness due to the formation of the through hole 163i.

Further, in the above-described configuration, as illustrated in FIGS. 10 to 12, the first reinforcement bead 163d is formed at a position overlapping the through hole 163i in the seat width direction.

Therefore, it is possible to reinforce the peripheral portion of the through hole 163i by the first reinforcement bead 163d and to suppress a decrease in stiffness of the seat support 160.

Figure 9:
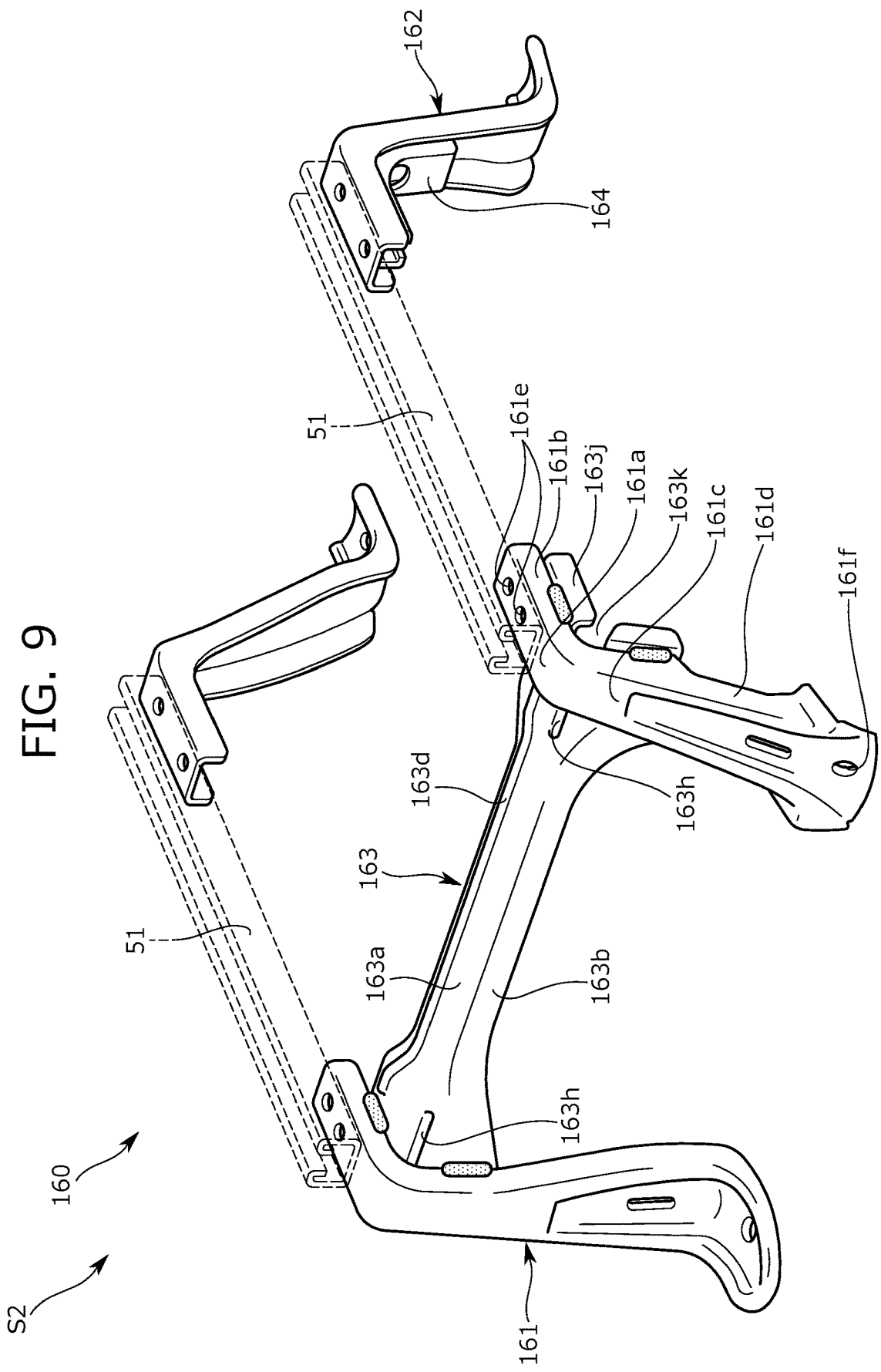
FIG. 9 is a perspective view of a seat support of a second embodiment.

Further, in the above-described configuration, as illustrated in FIGS. 9 to 11, both end portions of the upper wall portion 163a and the front wall portion 163b in the seat width direction are provided with the right and left bent portions 163j which protrude while being bent toward the side opposite to the front foot member 161.

Therefore, it is possible to improve the stiffness while suppressing an increase in size of the seat support 160 in the seat width direction.

Further, in the above-described configuration, as illustrated in FIGS. 11 and 12, the bent portion 163j is formed at a position overlapping the through hole 163i in the seat width direction.

Therefore, it is possible to reinforce the peripheral portion of the through hole 163i by the bent portion 163j and to suppress a decrease in stiffness of the seat support 160.

Further, in the above-described configuration, as illustrated in FIGS. 10 to 12, the front foot member 161 and the foot linking member 163 are welded to each other so that a first weld mark 163e and a second weld mark 163f are formed. At this time, the first weld mark 163e is formed at a position overlapping the through hole 163i in the seat width direction.

Therefore, it is possible to reinforce the peripheral portion of the through hole 163i by the welding (welding bead) and to suppress a decrease in stiffness of the seat support 160.

Further, in the above-described configuration, as illustrated in FIGS. 9 and 10, the right and left second reinforcement beads 163h are formed in the curved surface which is in contact with the front foot member 161 in the front wall portion 163b.

Specifically, the second reinforcement bead 163h is formed as a reinforcement recess which is formed to be recessed on the side opposite to the front foot member 161.

Therefore, it is possible to easily form the mating surface of the foot linking member 163 and the front foot member 161 and to increase the stiffness of the seat support 160.

Further, in the above-described configuration, as illustrated in FIGS. 11 and 12, an outer end portion of the second reinforcement bead 163h is formed at a position overlapping the through hole 163i in the front to back direction of the seat.

Therefore, it is possible to reinforce the peripheral portion of the through hole 163i by the second reinforcement bead 163h and to suppress a decrease in stiffness of the seat support 160.

Further, in the above-described configuration, as illustrated in FIG. 9, since the bent portion 163j extends along the outer end portion of the front foot member 161, the notch portion 163k is formed at the substantially center portion of the bent portion 163j in the extension direction.

Since the notch portion 163k is provided in this way, it is easy to form the bent portion 163j. That is, it is easy to form the bent portion 163j so that the bent portion does not protrude outward in the seat width direction.

Further, in the above-described configuration, as illustrated in FIGS. 9 and 12, the second reinforcement bead 163h is formed at a position (aligned position) overlapping the notch portion 163k in the seat width direction.

Therefore, it is possible to reinforce the peripheral portion of the notch portion 163k by the second reinforcement bead 163h and to suppress a decrease in stiffness of the seat support 160.

Further, in the above-described configuration, as illustrated in FIG. 9, the through hole 163i and the notch portion 163k are arranged at different positions in the seat width direction and the front to back direction of the seat.

Therefore, it is possible to suppress a decrease in stiffness of the seat support 160 in accordance with the formation of the through hole 163i and the notch portion 163k.

Further, in the above-described configuration, as illustrated in FIG. 12, an outer end portion of the bottom wall portion 163c of the foot linking member 163 is disposed at a position overlapping the through hole 163i in the front to back direction of the seat.

Therefore, it is possible to reinforce a peripheral portion of the through hole 163i by the bottom wall portion 163c and to suppress a decrease in stiffness of the seat support 160.

Further, in the above-described configuration, as illustrated in FIG. 12, an outer end portion of the first reinforcement bead 163d and an inner end portion of the second reinforcement bead 163h are arranged at an overlapping position in the front to back direction of the seat.

Since the reinforcement beads are arranged to overlap each other in this way, it is possible to improve the stiffness of the seat support 160 (the foot linking member 163).

Figure 13:
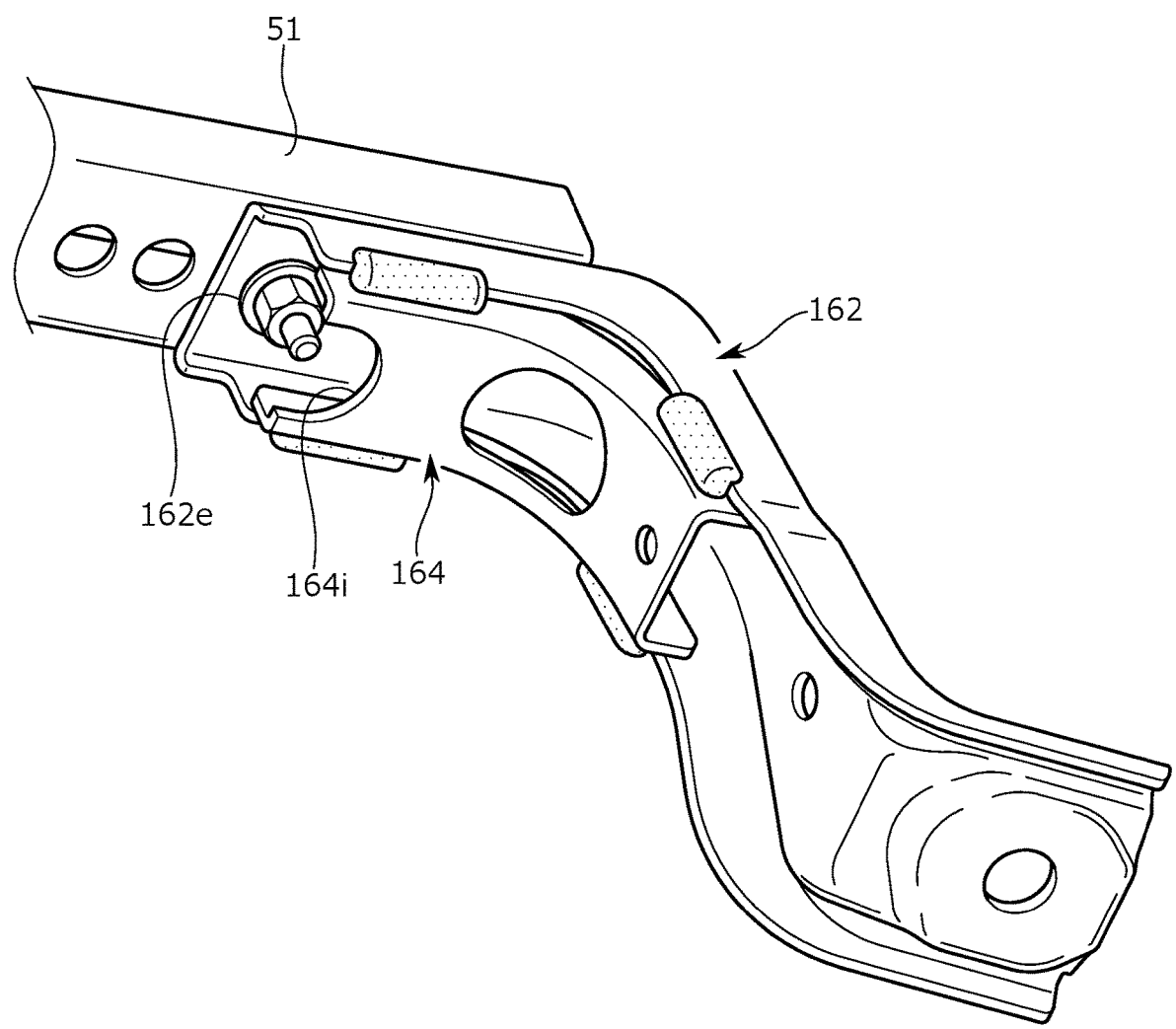
FIG. 13 is a perspective view of the seat support as viewed from a different angle and is a view illustrating a rear foot member.
Figure 14:
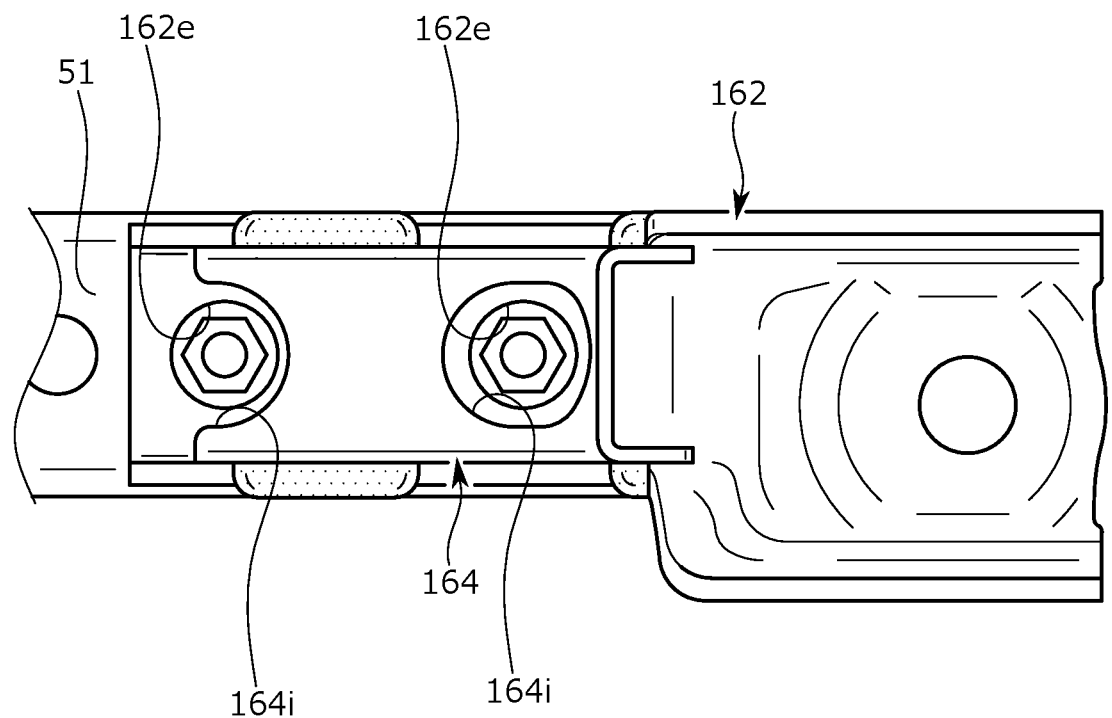
FIG. 14 is a bottom view of the seat support and is a view illustrating a rear foot member.

Further, in the above-described configuration, as illustrated in FIGS. 13 and 14, a through hole 164i is formed at a position opposing a rail attachment portion 162e provided in the rear foot member 162 of the reinforcement foot member 164.

Therefore, it is possible to improve the assembly workability with the lower rail 51.

Third Embodiment of Conveyance Seat

Figure 15:
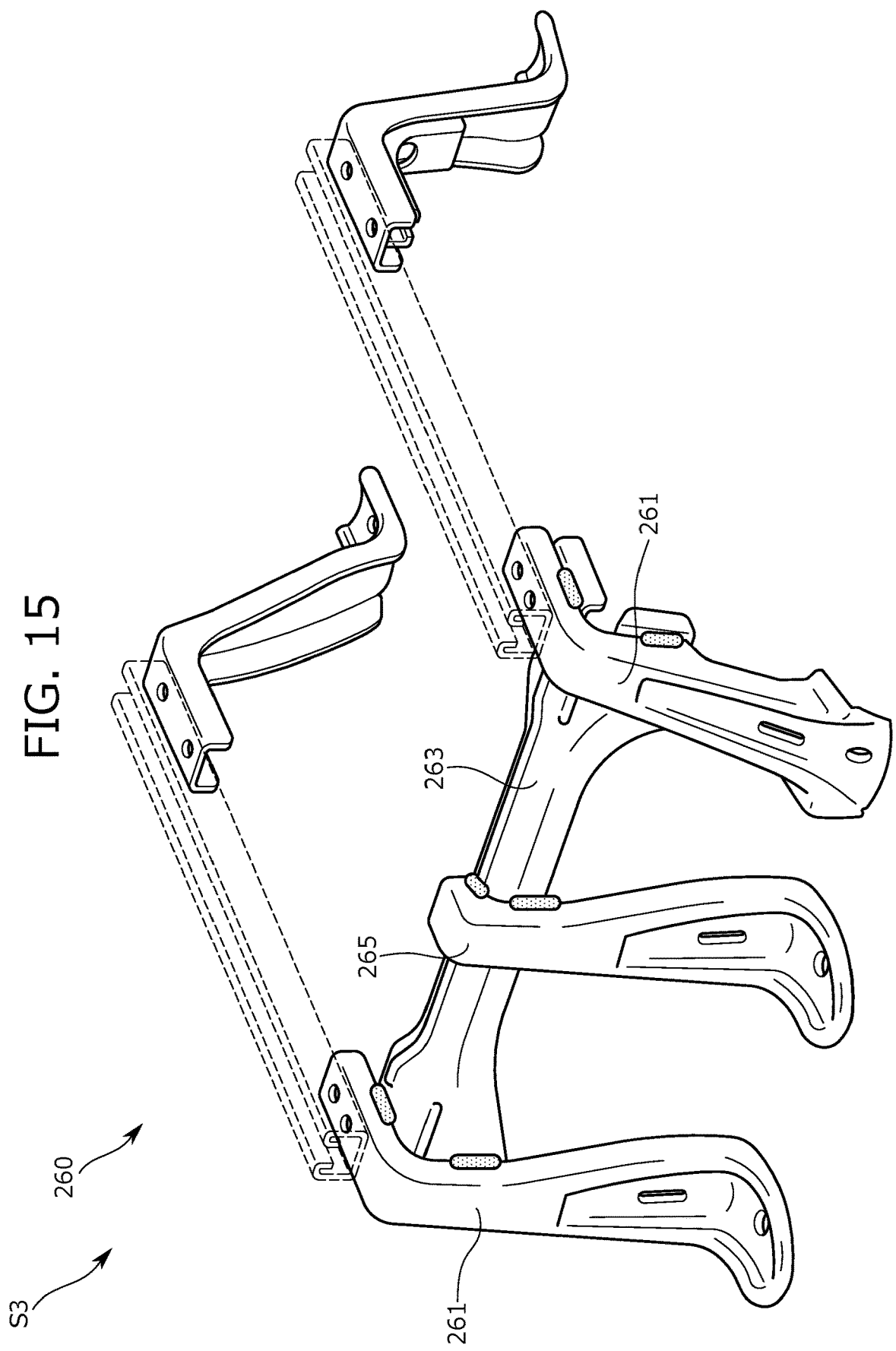
FIG. 15 is a perspective view of a seat support of a third embodiment.

Next, a third embodiment of the conveyance seat will be described with reference to FIG. 15.

A conveyance seat S3 of the third embodiment includes a seat support 260 instead of the seat support 60.

The seat support 260 includes right and left front foot members 261, a center front foot member 265 which is disposed between the right and left front foot members 261, and a foot linking member 263 that links the upper portions of the right and left front foot members 261 and the center front foot member 265.

The center front foot member 265 has the same shape as that of the right front foot member 261 and is attached to the foot linking member 263 similarly to the right and left front foot members 261.

With the above-described configuration, it is possible to more strongly fix the seat support 260 to the body floor.

With the above-described configuration, for example, a method of fixing only the center front foot member 265 among the right and left front foot members 261 and the center front foot member 265 onto the body floor can be considered. In this case, it is possible to increase the attachment workability of the seat support 260.

Fourth Embodiment of Conveyance Seat

Figure 16:
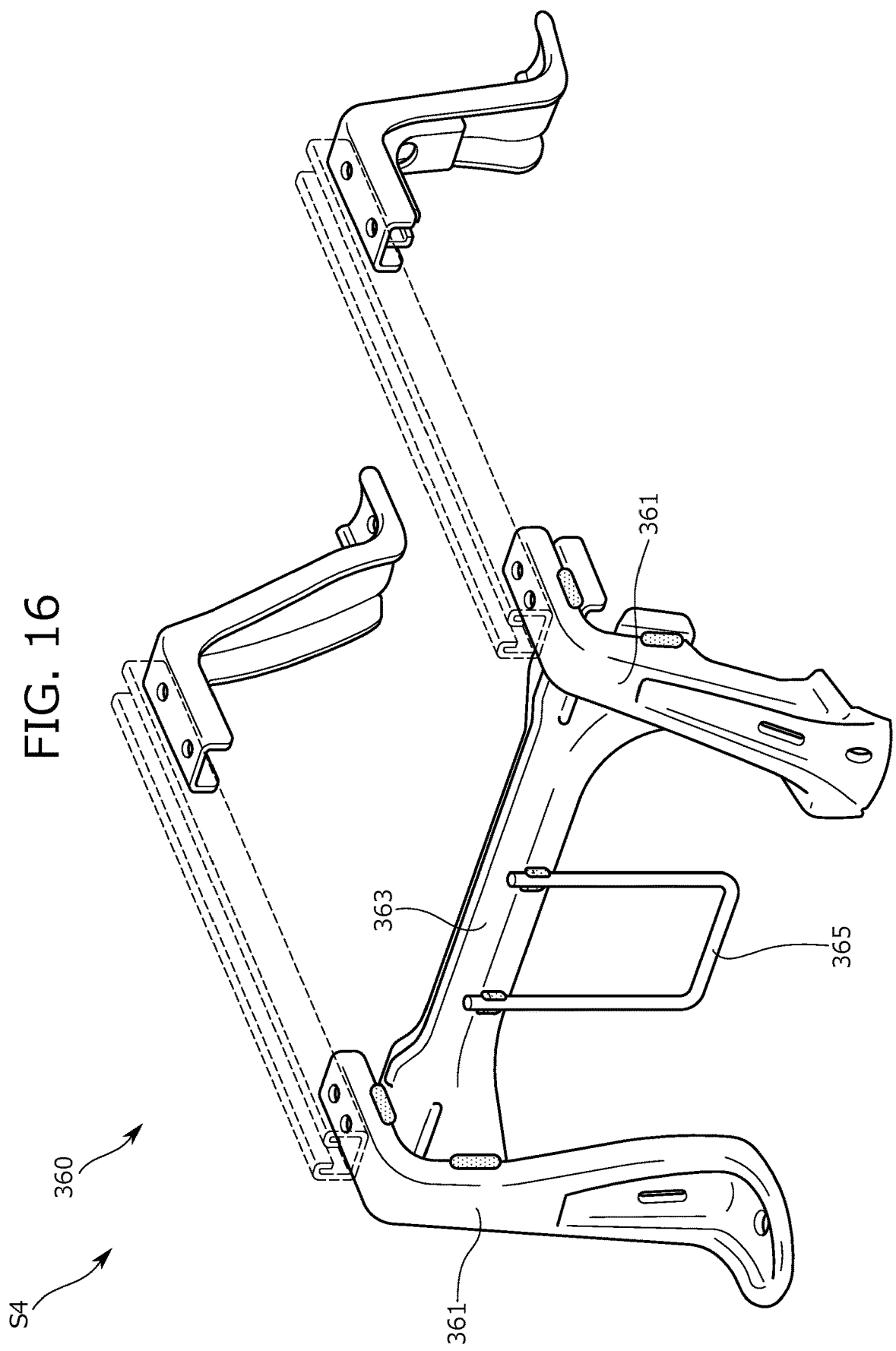
FIG. 16 is a perspective view of a seat support of a fourth embodiment.

Next, a fourth embodiment of the conveyance seat will be described with reference to FIG. 16.

A conveyance seat S4 of the fourth embodiment includes a seat support 360 instead of the seat support 60.

The seat support 360 includes right and left front foot members 361, a foot linking member 363 that links the upper portions of the right and left front foot members 361, and a regulation member 365 that is attached to the front surface of the foot linking member 363 and is disposed between the right and left front foot members 361.

The regulation member 365 is a substantially U-shaped wire member for regulating the intrusion of falling objects, foreign substances, and the like that have fallen below the seat.

The regulation member 365 extends downward from the center portion of the foot linking member 363 in the seat width direction toward the body floor.

With the above-described configuration, it is possible to regulate the intrusion of falling objects, foreign substances, and the like into the seat. Further, it is possible to regulate the stored items from jumping out of the seat from the storage space provided below the seat.

Additionally, the regulation member 365 can be changed without being particularly limited to the wire member and may be, for example, a plate-shaped member or the like. When the plate-shaped member is adopted as the regulation member 365, it is preferable to form a plurality of holes on the side surface of the plate-shaped member and the weight can be decreased.

Fifth Embodiment of Conveyance Seat

Figure 17:
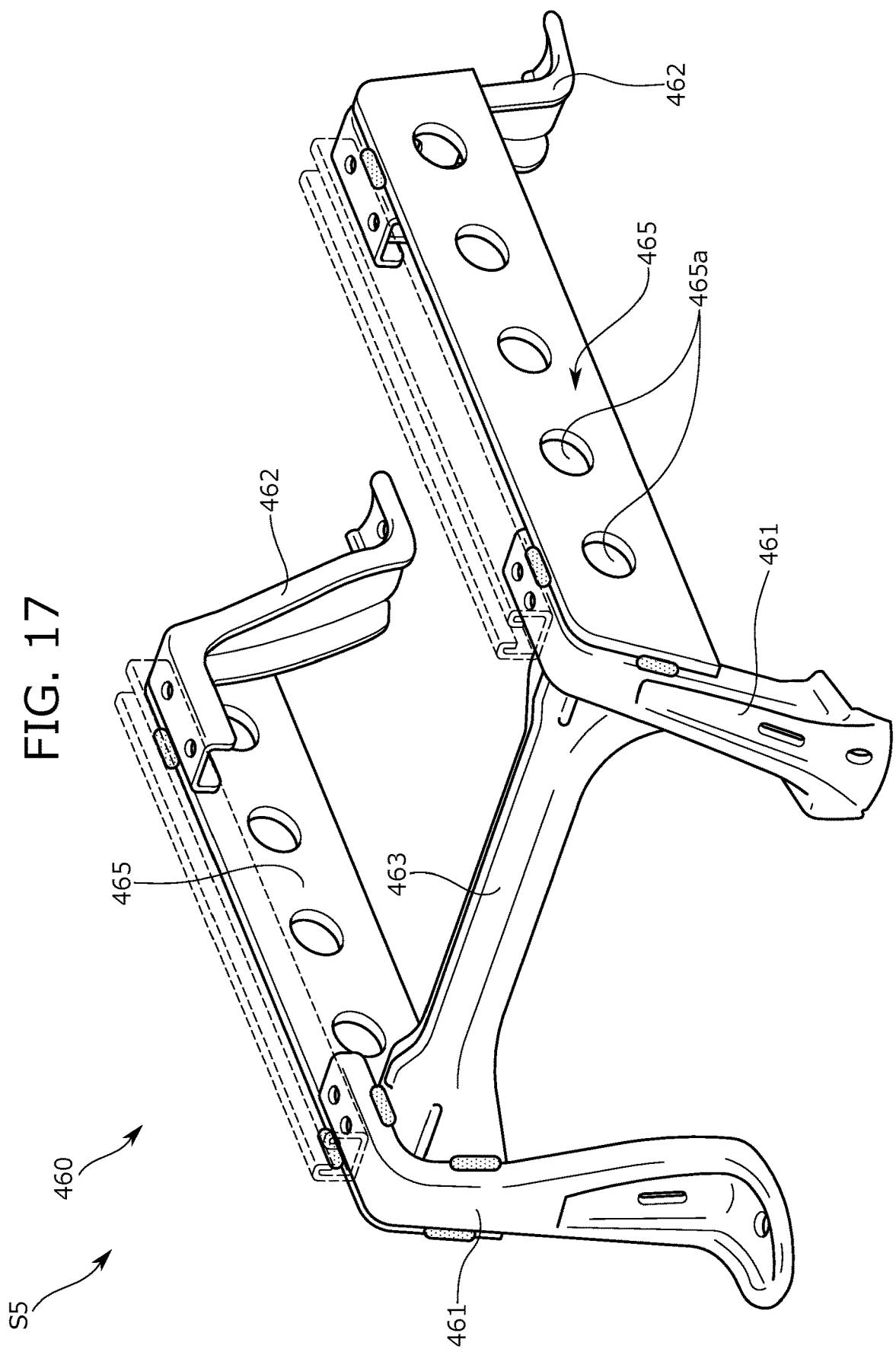
FIG. 17 is a perspective view of a seat support of a fifth embodiment.

Next, a fifth embodiment of the conveyance seat will be described with reference to FIG. 17.

A conveyance seat S5 of the fifth embodiment includes a seat support 460 instead of the seat support 60.

The seat support 460 includes right and left front foot members 461, right and left rear foot members 462, a foot linking member 463 that links the upper portions of the right and left front foot members 461, and a second foot linking member 465 that links the upper portions of the front foot member 461 and the rear foot member 462.

The second foot linking member 465 is a plate-shaped member that is long in the front to back direction of the seat and is attached to the outer surfaces of the front foot member 461 and the rear foot member 462 by welding.

A plurality of through holes 465a are formed on the outer surface of the second foot linking member 465 at a predetermined interval in the front to back direction of the seat.

With the above-described configuration, it is possible to improve the stiffness of the seat support 460.

Further, since the plurality of through holes 465a are formed as described above, it is possible to decrease the weight of the seat support 460.

Additionally, the second foot linking member 465 is not particularly limited to a plate-shaped member, but may be a pipe member or a wire member.

Sixth Embodiment of Conveyance Seat

Figure 18:
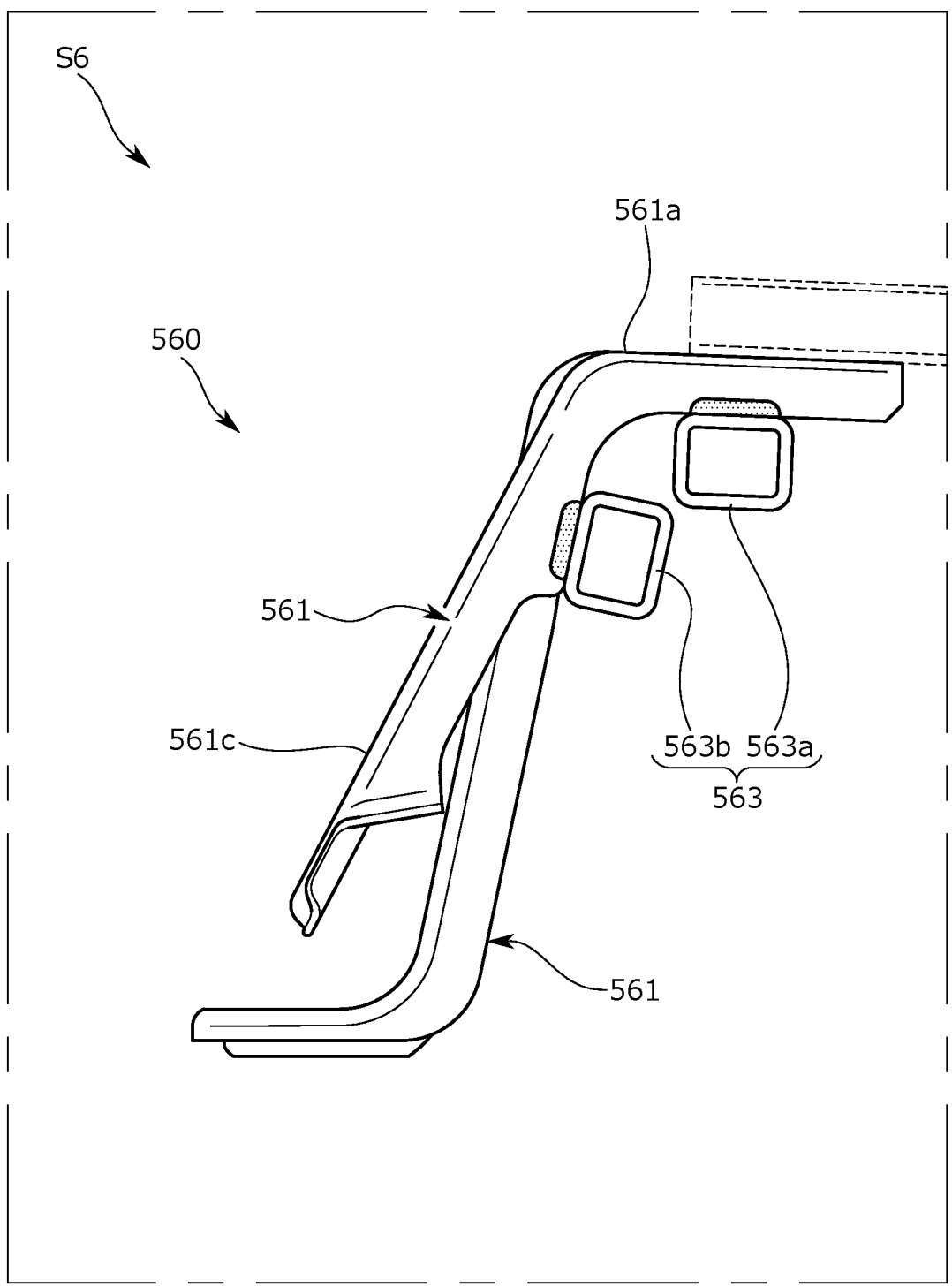
FIG. 18 is a perspective view of a seat support of a sixth embodiment.

Next, a sixth embodiment of the conveyance seat will be described with reference to FIG. 18.

A conveyance seat S6 of the sixth embodiment includes a seat support 560 instead of the seat support 60.

The seat support 560 includes right and left front foot members 561 and a foot linking member 563 that links the upper portions of the right and left front foot members 561.

The foot linking member 563 includes a first foot linking portion 563a which has a square pipe shape and links first opposing wall portions 561a of the right and left front foot members 561 and a second foot linking portion 563b which has a square pipe shape and links second opposing wall portions 561c of the right and left front foot members 561.

Each of the first foot linking portion 563a and the second foot linking portion 563b is attached to the front foot member 561 by welding.

With the above-described configuration, it is possible to increase the stiffness of the seat support 560 by a simple shape.

Additionally, the first foot linking portion 563a and the second foot linking portion 563b have a square pipe shape, but the first and second foot linking portions are not particularly limited and may have, for example, a circular pipe shape.

Seventh Embodiment of Conveyance Seat

Figure 19:
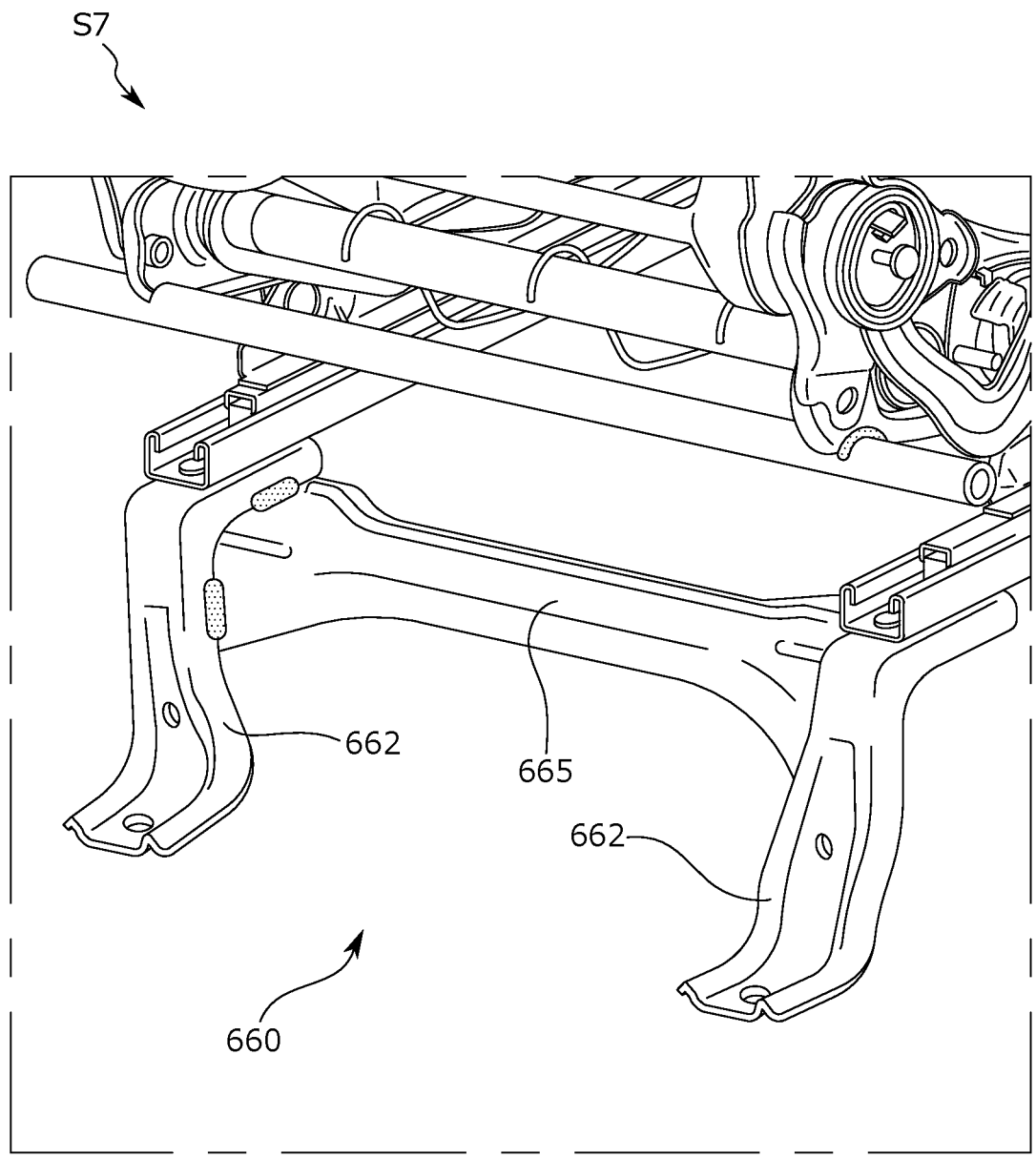
FIG. 19 is a perspective view of a seat support of a seventh embodiment.

Next, a seventh embodiment of the conveyance seat will be described with reference to FIG. 19.

A conveyance seat S7 of the sixth embodiment includes a seat support 660 instead of the seat support 60.

The seat support 660 includes right and left rear foot members 662 and a rear foot linking member 665 that links the upper portions of the right and left rear foot members 662.

The rear foot linking member 665 has the same shape as that of the foot linking member 163 of the second embodiment and links the right and left rear foot members 662 similarly to the foot linking member 163.

With the above-described configuration, it is possible to increase the stiffness of the seat support 660.

Other Embodiments

In the above-described embodiments, as illustrated in FIG. 2, the conveyance seat S includes the height link device 40 or the rail device 50, but these components are not essentially required. For example, the seat support 60 and the cushion frame 10 fixed to the body floor may be directly linked to each other.

In the above-described embodiments, as illustrated in FIG. 5, the upper portion of the front foot member 61 is disposed at a position opposing the foot linking member 63 in the up and down direction and the front to back direction of the seat, but this arrangement can be changed without particular limitation. The upper portion of the front foot member may be disposed at a position opposing the foot linking member 63 only in the up and down direction or may be disposed at an opposing position only in the front to back direction of the seat.

In the above-described embodiments, as illustrated in FIG. 5, the front foot member 61 extends from the lower portion toward the upper portion while being inclined toward the seat rear side, but this arrangement is not particularly limited. For example, the front foot member may extend from the lower portion toward the upper portion while being inclined inward or outward in the seat width direction.

In such a case, it is preferable that the front foot member 61 includes an opposing wall portion which is disposed at a position opposing the foot linking member 63 in the up and down direction and the seat width direction and front and rear side wall portions which are continuously bent from both end portions of the opposing wall portion in the front to back direction and protrude to abut toward the foot linking member 63.

In the above-described embodiments, as illustrated in FIG. 5, the foot linking member 63 is disposed at the lower position in relation to the right and left front foot members 61 and links the right and left front foot members 61, but this arrangement is not particularly limited. For example, the foot linking member may be disposed at the upper position in relation to the right and left front foot members.

In such a case, it is preferable to dispose the foot linking member 63 to be sandwiched between the lower rail 51 and the right and left front foot members in the up and down direction.

In the above-described embodiments, a conveyance seat used in an automobile has been described as a specific example, but the seat is not particularly limited and can be also used as a conveyance seat for an airplane or a ship in addition to a conveyance seat for a train or a bus.

In this embodiment, the conveyance seat according to the present invention has been mainly described.

However, the above-described embodiments are merely examples for facilitating the understanding of the present invention and do not limit the present invention. The present invention can be modified and improved without departing from the spirit thereof and it goes without saying that the present invention includes an equivalent thereof.

In particular, the arrangement and configuration of the seat support described in the above-described embodiments are merely examples and do not limit the present invention.

REFERENCE SIGNS LIST

S, S2, S3, S4, S5, S6, S7: conveyance seat
1: seat cushion
   1a, 2a: cushion pad
   1b, 2b: skin material
2: seat back
3: belt anchor
10: cushion frame
11: side frame
   11a: notch portion
   11b: reinforcement portion (reinforcement flange)
12: pan frame
13: rear linking frame
14: elastic spring
15: reinforcement linking frame
   15a: weld mark
   15b: overhang portion
20: back frame
21: back side frame
22: upper frame
23: lower frame
24: elastic spring
25: plate-shaped frame
26: attachment bracket
30: reclining device
31: back rotating shaft
32: spiral spring
33: spring locking bracket
34: spring locking member
40: height link device
41: front link
42: rear link (drive link)
   42a: sector gear portion
43: brake rotating shaft
50: rail device (seat support frame)
51: lower rail
52: upper rail
53: rail operating lever
54: link bracket
60, 160, 260, 360, 460, 560, 660: seat support
61, 161, 261, 361, 461, 561: front foot member (foot member)
   61a, 161a, 561a: first opposing wall portion
   61b, 161b: first side wall portion
   61c, 161c, 561c: second opposing wall portion
   61d, 161d: second side wall portion
   61e, 161e: rail attachment portion
   61f, 161f: floor attachment portion
62, 162, 462, 662: rear foot member
   62a: first opposing wall portion
   62b: first side wall portion
   62c: second opposing wall portion
   62d: second side wall portion
   162e: rail attachment portion
63, 163, 263, 363, 463, 563: foot linking member
   63a, 163a: upper wall portion
   63b, 163b: front wall portion
   63c, 163c: bottom wall portion
   63d, 163d: reinforcement bead, first reinforcement bead (reinforcement portion)
   63e, 163e: first weld mark
   63f, 163f: second weld mark
   63g, 163g: overhang portion
   163h: second reinforcement bead
   163i: through hole
   163j: bent portion
   163k: notch portion
   563a: first foot linking portion
   563b: second foot linking portion
64, 164: reinforcement foot member
   164i: through hole
265: center front foot member
365: regulation member
465: second foot linking member
   465a: through hole
665: rear foot linking member

The invention claimed is:

1. A conveyance seat, comprising:
a seat body which includes a seat cushion corresponding to a seating portion; and
a seat support which is attached to a body floor and supports the seat body from below,
wherein the seat support includes:
right and left foot members that are attached to the body floor with a gap therebetween in a seat width direction and extend to protrude upward from the body floor, and
a foot linking member that links upper portions of the right and left foot members and is disposed to partially overlap the right and left foot members in an up and down direction or a front to back direction of the seat,
wherein the foot member includes:
an opposing wall portion which is disposed at a position opposing the foot linking member in the up and down direction or the front to back direction of the seat, and
a side wall portion which is continuously bent from each of both end portions of the opposing wall portion and protrudes to abut toward the foot linking member, and
wherein a closed section structure is formed by the opposing wall portion of the foot member, each side wall portion of the foot member, and the foot linking member.

2. The conveyance seat according to claim 1,
wherein the foot member includes:
a first opposing wall portion which is the opposing wall portion opposing the foot linking member in the up and down direction, and
a second opposing wall portion which is disposed at a position opposing the foot linking member in the front to back direction of the seat or the seat width direction, and
wherein a first closed section structure is formed as the closed section structure and a second closed section structure is formed by a second side wall portion protruding from each of both end portions of the second opposing wall portion of the foot member, the second opposing wall portion of the foot member, and the foot linking member.

3. The conveyance seat according to claim 1,
wherein both end portions of the foot linking member in the seat width direction are formed to have a width larger than that of a center portion thereof in the seat width direction and are respectively attached to the foot member.

4. The conveyance seat according to claim 1,
wherein a contact surface which is in contact with the foot member in the foot linking member is provided with a reinforcement portion which extends from a center portion toward both end portions in the seat width direction.

5. The conveyance seat according to claim 4,
wherein both end portions of a seat rear end of the foot linking member in the seat width direction are formed to protrude toward a seat rear side in relation to a center portion thereof in the seat width direction, and
wherein the reinforcement portion extends in the seat width direction along the seat rear end of the foot linking member.

6. The conveyance seat according to claim 4,
wherein an outer peripheral portion of a portion in which the foot member and the foot linking member are in contact with each other is welded so that a weld mark is formed in at least one of the foot member and the foot linking member, and
wherein the weld mark and the reinforcement portion are arranged at positions aligned in the seat width direction.

7. The conveyance seat according to claim 1,
wherein the foot linking member includes an overhang portion which protrudes outward in the seat width direction in relation to the foot member, and
wherein an outer peripheral portion of a portion in which the overhang portion of the foot linking member is in contact with the side wall portion of the foot member in the up and down direction is welded.

8. The conveyance seat according to claim 1,
wherein the seat support includes a front foot member as the foot member and a rear foot member which are attached to the body floor with a gap therebetween in the front to back direction of the seat,
wherein the foot linking member links the right and left front foot members,
wherein a reinforcement foot member that is disposed at a position opposing the rear foot member in the up and down direction or the front to back direction of the seat is attached to the rear foot member on the arrangement side of a belt anchor locking a seat belt in the right and left rear foot members, and
wherein a closed section structure is formed by the rear foot member and the reinforcement foot member.

9. The conveyance seat according to claim 1, further comprising:
a lower rail which is attached to an upper surface of the foot member in the seat support; and
an upper rail which is supported by the lower rail to be relatively movable and supports the seat body from below,
wherein an upper portion of the foot member is disposed to be sandwiched between the lower rail and the foot linking member in the up and down direction, and
wherein a portion having the lower rail attached thereto and a portion having the foot linking member attached thereto in the foot member are arranged at an overlapping position in the up and down direction.

10. A manufacturing method of a conveyance seat, comprising:
preparing a seat body which includes a seat cushion corresponding to a seating portion, and a seat support;
attaching the seat support to a body floor, and
supporting the seat body from below on the seat support,
wherein the seat support includes:
right and left foot members that are attached to the body floor with a gap therebetween in a seat width direction and extend to protrude upward from the body floor, and
a foot linking member that links upper portions of the right and left foot members and is disposed to partially overlap the right and left foot members in an up and down direction or a front to back direction of the seat,
wherein the foot member includes:
an opposing wall portion which is disposed at a position opposing the foot linking member in the up and down direction or the front to back direction of the seat, and
a side wall portion which is continuously bent from each of both end portions of the opposing wall portion and protrudes to abut toward the foot linking member, and
wherein a closed section structure is formed by the opposing wall portion of the foot member, each side wall portion of the foot member, and the foot linking member.

* * * * *